(12) United States Patent
Lee et al.

(10) Patent No.: US 11,402,123 B2
(45) Date of Patent: Aug. 2, 2022

(54) MICROPERFORATED CONDUIT

(71) Applicant: 3M INNOVATIVE PROPERTIES COMPANY, St. Paul, MN (US)

(72) Inventors: Seungkyu Lee, Woodbury, MN (US); Thomas P. Hänschen, Mendota Heights, MN (US); Jonathan H. Alexander, Roseville, MN (US); Thomas Herdtle, Inver Grove Heights, MN (US); Ronald W. Gerdes, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 382 days.

(21) Appl. No.: 16/492,393

(22) PCT Filed: Jun. 26, 2018

(86) PCT No.: PCT/US2018/039585
§ 371 (c)(1),
(2) Date: Sep. 9, 2019

(87) PCT Pub. No.: WO2019/005858
PCT Pub. Date: Jan. 3, 2019

(65) Prior Publication Data
US 2021/0140678 A1    May 13, 2021

Related U.S. Application Data

(60) Provisional application No. 62/526,198, filed on Jun. 28, 2017.

(51) Int. Cl.
*F16L 55/033* (2006.01)
*F24F 13/24* (2006.01)
(Continued)

(52) U.S. Cl.
CPC ........... *F24F 13/24* (2013.01); *F16L 55/0336* (2013.01); *F24F 13/02* (2013.01); *F24F 2013/245* (2013.01)

(58) Field of Classification Search
CPC ...... G10K 11/16; G10K 11/00; G10K 11/161; G10K 11/168; G10K 11/172;
(Continued)

(56) References Cited

U.S. PATENT DOCUMENTS 1,666,257 A  *  4/1928  Furnivall ............... F01N 1/081
                                                55/516
1,811,762 A  *  6/1931  Schnell .................... F01N 1/24
                                                181/248
(Continued)

FOREIGN PATENT DOCUMENTS

CN     107622763 A  *  1/2018
CN     108223383 A  *  6/2018   ............. F04C 29/06
(Continued)

OTHER PUBLICATIONS

Lee, "Design of multi-chamber cylindrical silencers with microperforated elements,", Noise Control Engr. J., 2016, vol. 64, No. 4, pp. 532-543.
(Continued)

*Primary Examiner* — Edgardo San Martin
(74) *Attorney, Agent, or Firm* — Philip P. Soo

(57) ABSTRACT

Provided are conduits for air flow that are capable of reducing noise and related methods. The provided conduits include a first section that is tubular and substantially non-perforated and a second section with at least a portion having a multiplicity of microperforations that provide an average flow resistance of from 50 MKS Rayls to 8000 MKS Rayls therethrough. The second section is either (a) tubular and connected in series with the first section, with an outer
(Continued)

surface of the second section being in fluid communication with an outer surface of the conduit, or (b) disposed within the first section.

16 Claims, 9 Drawing Sheets

(51) Int. Cl.
*G10K 11/16* (2006.01)
*F24F 13/02* (2006.01)

(58) Field of Classification Search
CPC ..... F16L 55/033; F16L 55/02; F16L 55/0331; F16L 55/0336; F24F 13/24; F24F 13/02; F24F 2013/242; F24F 2013/245; F01N 1/02; F01N 1/04; F01N 1/026; F01N 1/10; F01N 1/0003; F01N 1/0006; F02M 35/12; F02M 35/1255; F02M 35/1272
See application file for complete search history.

(56) References Cited

U.S. PATENT DOCUMENTS

| | | | | |
|---|---|---|---|---|
| 2,297,046 | A * | 9/1942 | Bourne | F01N 1/02 110/184 |
| 2,392,559 | A * | 1/1946 | Varma | F01N 1/081 181/258 |
| 3,118,517 | A * | 1/1964 | Ludlow | F01N 1/02 181/227 |
| 3,146,851 | A * | 9/1964 | Ludlow | F01N 1/02 181/227 |
| 3,187,835 | A * | 6/1965 | Smith | B64F 1/26 181/221 |
| 4,645,032 | A * | 2/1987 | Ross | F02C 7/24 181/224 |
| 5,162,620 | A | 11/1992 | Ross | |
| 6,617,002 | B2 | 9/2003 | Wood | |
| 6,977,109 | B1 | 12/2005 | Wood | |
| 7,731,878 | B2 | 6/2010 | Wood | |
| 8,256,569 | B1 * | 9/2012 | Huff | F01N 1/026 181/252 |
| 10,352,210 | B2 * | 7/2019 | Hanschen | F01N 1/006 |
| 2002/0121404 | A1 | 9/2002 | Storm | |
| 2002/0134614 | A1 * | 9/2002 | Chen | F01N 13/20 181/252 |
| 2016/0159028 | A1 | 6/2016 | Oleske | |

FOREIGN PATENT DOCUMENTS

| | | | | |
|---|---|---|---|---|
| EP | 2851526 | A1 * | 3/2015 | F01N 1/003 |
| FR | 3027995 | A1 * | 5/2016 | F01N 1/006 |
| WO | WO-2015018910 | A1 * | 2/2015 | F02M 35/10 |
| WO | WO-2015152858 | A1 * | 10/2015 | F01N 1/02 |
| WO | WO 2016-040431 | | 3/2016 | |

OTHER PUBLICATIONS

Lee, "Study of an axial fan combined with a microperforated duct," inter.noise 2015, 2015, pp. 1878-1890.

Lee, "Design of an acoustic silencer with the microperforated elements considering flow effects", 2015, inter.noise 2015, pp. 1307-1321.

International Search report for PCT International Application No. PCT/US2018/039585 dated Oct. 31, 2018, 5 pages.

Anonymous: "Polymers—Physical Properties", Jul. 15, 2016 (Jul. 15, 2016), P055289009, Retrieved from the Internet: URL:http://www.engineeringtoolbox.com/polymer-properties-d_ 1222.html [retrieved on Jul. 15, 2016].

* cited by examiner icroperforated conduit walls with microperforated conduit walls.
In some embodiments, the microperforated conduit sections
can be positioned sequentially, or in series, with non-
perforated conduit sections. In other embodiments, the
microperforated conduit sections can be positioned in par-
allel with non-perforated conduit sections.

In further embodiments, the microperforated sections of
conduit can be configured with additional sound absorptive
materials such as foams, fibers, additional layers of microp-
erforated surface, non-perforated surfaces, and acoustically
active particles.

These provided conduit configurations are advantageous
because they can significantly reduce noise attributable to air
flow and vibrations without occupying substantially greater
space within the space enclosing the conduit. In some
embodiments, these configurations enable existing conduit
to be retrofitted with an improved conduit configuration that
significantly reduces noise without compromising pressure
drop or system performance.

In one aspect, a conduit for air flow is provided. The
conduit comprises: a first section that is tubular and sub-
stantially non-perforated; and a second section with at least
a portion having a multiplicity of microperforations that
provide an average flow resistance of from 50 MKS Rayls
to 8000 MKS Rayls therethrough, wherein the second sec-
tion is either (a) tubular and connected in series with the first
section, with an outer surface of the second section being in
fluid communication with an outer surface of the conduit, or
(b) disposed within the first section.

In a second aspect, an HVAC system comprising the
aforementioned conduit is provided.

In a third aspect, a method of reducing noise in an existing
conduit is provided, comprising: removing a first section of
conduit from the existing conduit to form a remaining
portion of the conduit, with the first section being substan-
tially non-perforated; and inserting in place of the first
section a second section of conduit with at least a portion
having a multiplicity of microperforations in fluid commu-
nication with the remaining portion of the conduit.

MICROPERFORATED CONDUIT

CROSS REFERENCE TO RELATED APPLICATIONS

This application is a national stage filing under 35 U.S.C.
371 of PCT/US2018/039585, filed Jun. 26, 2018, which
claims the benefit of U.S. Provisional Patent Application No.
62/526,198, filed Jun. 28, 2017, the disclosures of which are
incorporated by reference in their entirety herein.

FIELD OF THE INVENTION

Described herein are conduits that provide noise reduc-
tion. The provided conduits may be adapted in particular for
directing air flow in heating, ventilation, and air condition-
ing systems.

BACKGROUND

Heating, ventilation, and air conditioning (HVAC) sys-
tems represent an essential part of many dwellings, includ-
ing homes, office buildings, large manufacturing facilities,
cars, and aircraft. Powered by large fans or blowers, HVAC
systems provide much needed air flow and temperature
regulation throughout inhabited areas of buildings and
vehicular cabins.

Air flowing through HVAC duct work, or conduit, is a
major source of background noise. At high levels of air flow,
such background noise can be unpleasant to inhabitants and
considered noise pollution. Part of this noise is generated by
the air flow directly as it meanders through a complex and
often tortuous conduit system. Another part is noise gener-
ated indirectly from mechanical vibrations of conduit and its
supports caused by the movement of air within these struc-
tures. Noise reduction can be especially challenging because
of the sprawling nature of an HVAC system, which provides
pathways for sound to propagate throughout the building or
vehicle. Reducing such noise remains a significant technical
problem.

SUMMARY

There are various ways to mitigate the noise generated by
air flow through a conduit. If the level of noise cannot be
reduced at its source, noise can be reduced through isolation
or damping. Isolation works by containing the vibrations
within a barrier. Damping is based on dissipating the vibra-
tion by converting the sound energy into another form of
energy such as heat. Isolation and damping sometimes work
in combination to maximize effectiveness of an overall noise
reduction solution.

Solutions to the problem of noise induced by air flow
nearly always involve compromises. There are limits, for
example, to how far one can reduce the level of noise at its
source. While conduit can be wrapped with a soundproofing
material to block or damp noise, space constraints often
prevent bulky sound proofing materials from being intro-
duced. Certain sound absorbing materials are problematic
since they are combustible or otherwise pose an inhalation
or contact hazard to human health. Finally, the inclusion of
sound damping materials can, in some cases, impair HVAC
performance by disrupting preferred air flow patterns.

The provided conduits can address the above problems
through use of a microperforations to attenuate the noise for
HVAC and other fluid flow applications. Noise reduction can
be achieved by either supplementing or replacing non-

Figure 1:
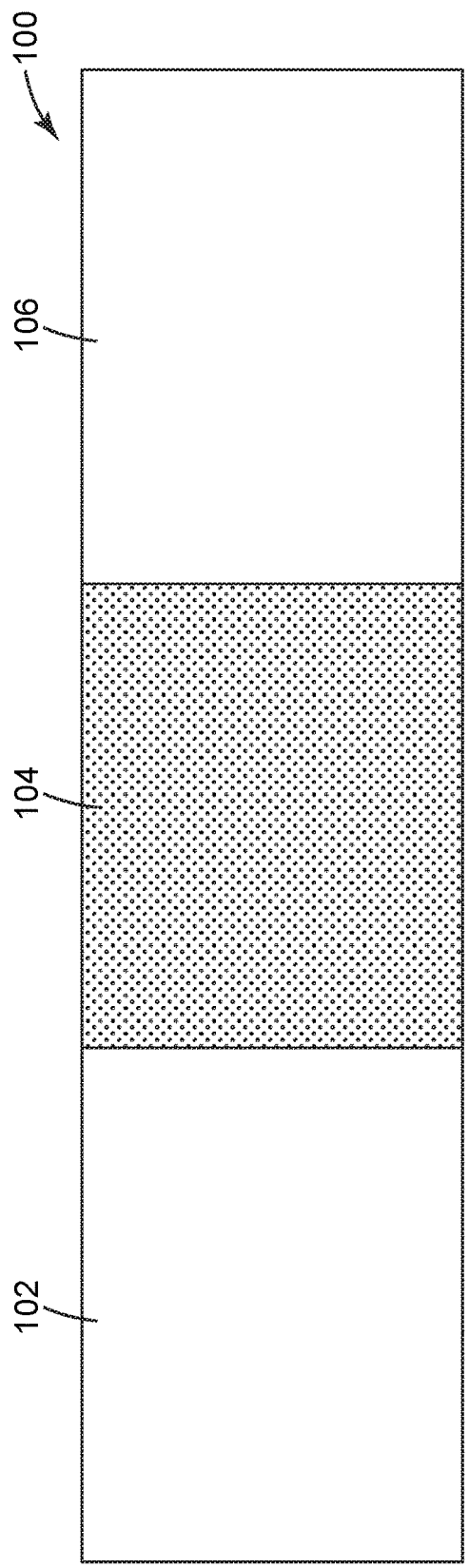
FIG. 1 is a front, elevational view of a conduit according
to a first exemplary embodiment.

Repeated use of reference characters in the specification
and drawings is intended to represent the same or analogous
features or elements of the disclosure. It should be under-
stood that numerous other modifications and embodiments
can be devised by those skilled in the art, which fall within
the scope and spirit of the principles of the disclosure. The
figures may not be drawn to scale.

Definitions

As used herein:

"ambient conditions" means at 25° C. and 101.3 kPa (1
atm) pressure;

"diameter" refers to the longest transverse dimension of a
given object;

"microperforation" refers to an aperture extending through a given material having a diameter of less than 500 micrometers;

"substantially" means at least 70 percent, at least 80 percent, at least 90 percent, at least 95 percent, at least 97 percent, at least 98 percent, or at least 99 percent.

DETAILED DESCRIPTION

Conduits, conduit assemblies, and related methods are herein described in the following passages by way of illustration and example. The provided conduits are generally part of a larger and more complex system, such as an HVAC system or exhaust system. In some embodiments, these conduits may be provided as a replacement for an existing section of conduit. The conduit sections exemplified may be intermediate or terminal sections of the conduit system. Combinations of the provided conduits may be advantageously deployed.

While the provided conduits and assemblies are intended to direct air flow, these devices need not be so limited. For example, these conduits and assemblies may be used to reduce noise when conveying any of a variety of gases or fluidic substances in general.

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Drawings are not necessarily to scale.

Figure 2:
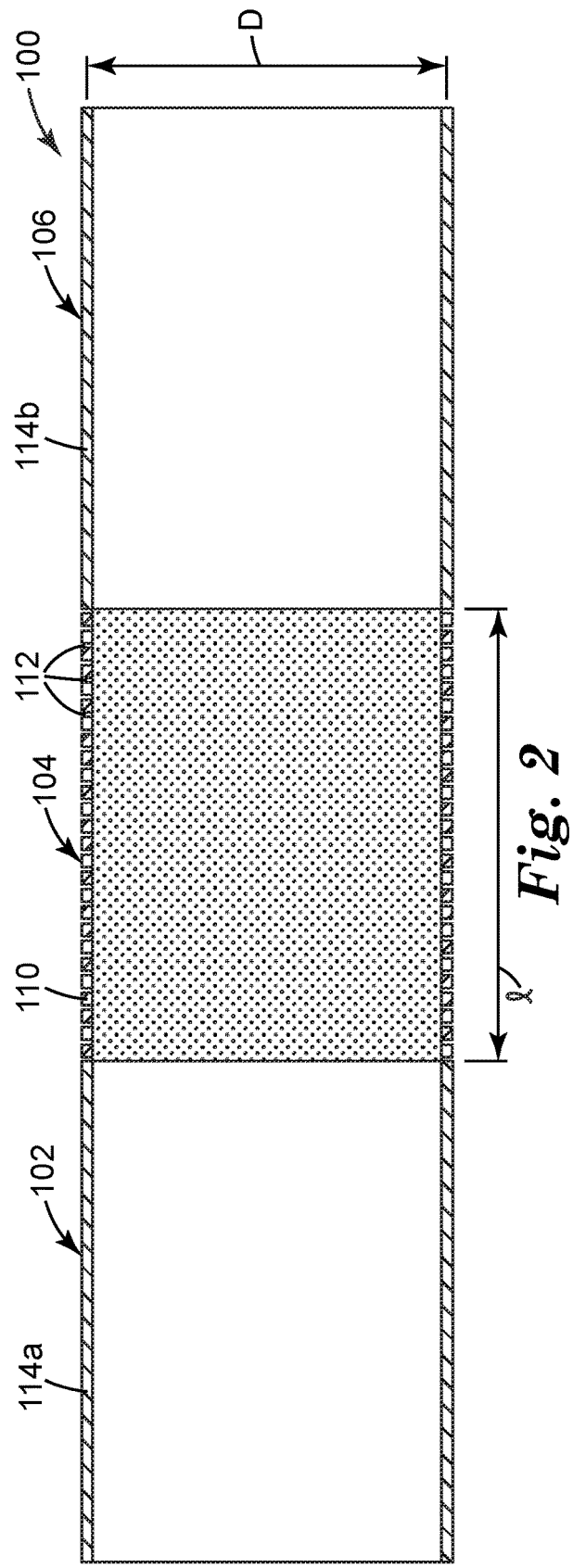
FIG. 2 is a side, cross-sectional view of the conduit of
FIG. 1.

A conduit for air flow according to one exemplary embodiment is illustrated in FIGS. 1-2 and hereinafter referred to by numeral 100. The conduit 100, as shown, includes a non-perforated section 102 and a microperforated section 104 coupled to each other in series. Optionally and as shown, the conduit 100 can include a third, non-perforated section 106 coupled in series to the non-perforated and microperforated sections 102, 104. In FIGS. 1-2, and in subsequent figures unless otherwise noted, air flows through the conduit from left to right by convention.

All three sections 102, 104, 106 are tubular in shape, with interior air spaces in fluid communication with each other, as revealed in the cross-sectional view of FIG. 2. Moreover, the outer surface of the microperforated section 104 represents an outer surface of the conduit 100. As a result, interior air spaces can communicate with the air spaces exterior to the conduit 100. This condition is maintained even when porous acoustic insulation materials are disposed along outer-facing surfaces of the microperforated section 104, as will be described later.

In this embodiment, the sections 102, 104, 106 each have a cylindrical shape concentric about a longitudinal axis of the conduit 100. It is to be understood, however, that the term tubular is broadly used and sections 102, 104, 106 need not be cylindrical. For example, the sections 102, 104, 106 could have a cross-sectional shape that is square, rectangular or any other shape, including irregular shapes, or may vary in cross-sectional area, without impairing the function of the conduit 100. The conduit 100, while depicted here as a linear section for simplicity, may also contain one or more gradual or abrupt bends in practice, as could be required in a given application.

The microperforated section 104 is comprised of a tubular wall 110 and a multiplicity of perforations 112 (i.e., throughholes) extending therethrough. The perforations 112 allow air to flow between air spaces located on opposing sides of the tubular wall 110. The adjacent sections 102, 106 are comprised of a tubular walls 114a, 114b that lack perforations. In some embodiments, the tubular walls 114a, 114b are not strictly non-perforated. For example, one or both of the tubular walls 114a, 144b may be slightly microperforated, with a porosity of up to 50%, up to 40%, up to 30%, up to 20%, up to 10%, up to 5%, up to 4%, up to 3%, up to 2%, or up to 1% that of the tubular wall 110.

Referring again to FIG. 2, both the inner and the outer diameter of the tubular wall 110 essentially matches that of the tubular walls 114a, 144b. In some embodiments, the inner diameter of the tubular wall 110 essentially matches that of the adjoining tubular wall 114a, 144b, while the outer diameters do not match. In other embodiments, neither the inner nor outer diameters match. Notwithstanding the above, it is generally preferred that the inner diameters of the walls 110, 114a, 114b are generally constant to provide for an orderly flow pattern of air through the conduit 100 and avoid turbulence, which can increase friction effects.

In FIG. 2, and other selected figures, certain dimensions are labeled—e.g., D, D1, D2, and $\ell$. These are referred to in certain Examples for the purpose of modeling acoustic response. When used in these acoustic models, these dimensions are based on conduit walls that are thin, for which differences between the inner and outer diameters are negligible.

The sections 102, 104, 106 of the conduit 100 need not have a constant cross-sectional area or shape. For example, a section may have a cross-sectional area that increases or decreases along the direction of air flow. Such increase or decrease may be continuous and monotonic, as for a truncated cone. The cross-sectional shape of the section can also change or rotate along the direction of air flow.

The perforations 112 define approximately cylindrical plugs of air that acts as mass components within a resonant system. These mass components vibrate within the perforations 112 and dissipate sound energy as a result of friction between the plugs of air and the walls of the perforations 112. Dissipation of sound energy can also occur as a result of destructive interference at the entrance of the perforations 112 from sound waves reflected back towards the perforations 112 from the opposite direction.

In the conduit 100, the perforations 112 can be advantageously tuned by adjusting their arrangement (e.g. numbers and spacing) and dimensions (e.g. perforation diameter, shape and length), to obtain a desired acoustic performance over a given frequency range while minimizing the pressure drop between the inlet 106 and outlet 108. Acoustic performance is commonly measured, for example, by transmission loss through the conduit 100, which is defined here as the accumulated decrease in acoustic intensity as an acoustic pressure wave propagates through the conduit 100.

In the figures, the perforations 112 are disposed along the entire surface of the tubular wall 110. Alternatively, the tubular wall 110 could be only partially microperforated—that is, microperforated in some areas but not others. In certain instances, the microperforated areas of the tubular wall 110 can extend along longitudinal directions and be adjacent to one or more non-perforated areas—for example, the tubular wall could have a rectangular cross-section tube with only one or two sides microperforated.

The perforations 112 can have a wide range of geometries and dimensions and may be produced by any of a variety of cutting or punching operations. The cross-section of the perforations 112 can be, for example, circular, square, or hexagonal. In some embodiments, the perforations 112 are represented by an array of elongated slits. While the perforations 112 in FIG. 2 have diameters that are uniform along their length, it is possible to use perforations that have the shape of a truncated cone or otherwise have side walls tapered along at least some their length. Various perforation configurations and ways of making the same are described in U.S. Pat. No. 6,617,002 (Wood).

Optionally and as shown in the figures, the perforations 112 have a generally uniform spacing with respect to each other. If so, the perforations 112 may be arranged in a two-dimensional box pattern or staggered pattern. The perforations 112 could also be disposed on the tubular wall 110 in a randomized configuration where the exact spacing between neighboring perforations is non-uniform but the perforations 112 are nonetheless evenly distributed across the tubular wall 110 on a macroscopic scale.

In some embodiments, the perforations 112 are of essentially uniform diameter along the tubular wall 110. Alternatively, the perforations 112 could have some distribution of diameters. Either way, in preferred embodiments of the conduit 100, the average narrowest diameter of the perforations 112 is at least 10 micrometers, at least 15 micrometers, at least 20 micrometers, at least 25 micrometers, or at least 30 micrometers. Further, the average narrowest diameter of the perforations 112 is preferably at most 300 micrometers, at most 250 micrometers, at most 200 micrometers, at most 175 micrometers, or at most 150 micrometers. For the sake of clarity, the diameter of non-circular holes is defined herein as the diameter of a circle having the equivalent area as the non-circular hole in plan view.

By its nature, the microperforated tubular wall 110 has a specific acoustic impedance, which is the ratio in frequency space of pressure differences across the tubular wall and the effective velocity approaching that surface. In the theoretical model of rigid walls with perforations, the velocity derives from air moving into and out of the holes. If the wall is flexible, motion of the wall can contribute to the calculation. Specific acoustic impedance generally varies as a function of frequency and is a complex number, which reflects the fact that pressure and velocity waves can be out of phase.

As used herein, specific acoustic impedance is measured in MKS Rayls, in which 1 Rayl is equal to 1 pascal-second per meter (Pa·s·m−1), or equivalently, 1 newton-second per cubic meter (N·s·m−3), or alternatively, 1 kg·s−1·m−2. The plurality of perforations 112 in the conduit 100 are preferably sized to achieve significant acoustic attenuation over the speech frequency range extending approximately from 250 Hz to 4000 Hz.

The microperforated tubular wall 110 of the conduit 100 can be characterized by its transfer impedance. For a relatively thin film, transfer impedance is the difference between the acoustic impedance on the incident side of the film and the acoustic impedance one would observe if the film were not present—that is, the acoustic impedance of the air cavity alone. In particular embodiments, the perforations 112 are sized to provide an acoustic transfer impedance having a real component of at least 100 Rayls, at least 200 Rayls, at least 250 Rayls, at least 300 Rayls, at least 325 Rayls, or at least 350 Rayls. Moreover, the plurality of perforations 112 can be sized to provide an acoustic transfer impedance having a real component of at most 5000 Rayls, at most 4000 Rayls, at most 3000 Rayls, at most 2000 Rayls, at most 1500 Rayls, at most 1400 Rayls, at most 1250 Rayls, at most 1100 Rayls, or at most 1000 Rayls (all in MKS Rayls).

The flow resistance is the low frequency limit of the transfer impedance. Experimentally, this can be estimated by blowing a known, small velocity of air at the microperforated tubular wall 110 and measuring the pressure drop associated therewith. The flow resistance can be determined as the measured pressure drop divided by the velocity.

In various embodiments, the flow resistance through the tubular wall 110 is from 50 MKS Rayls to 8000 MKS Rayls, 100 MKS Rayls to 4000 MKS Rayls, or 400 MKS Rayls to 3000 MKS Rayls. In some embodiment, the flow resistance through the tubular wall 110 is less than, equal to, or greater than 50 MKS Rayls, 60, 70, 80, 90, 100, 120, 140, 160, 180, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, or 8000 MKS Rayls.

The porosity of the tubular wall 110 is a dimensionless quantity representing the fraction of a given volume not occupied by solid structure. In the simplified representation shown in FIGS. 1-2, the perforations 112 can be assumed to be cylindrical, in which case porosity is well approximated by the percentage of the surface area of the tubular wall 110 displaced by the perforations 112 in plan view. In exemplary embodiments, the tubular wall 110 can have a porosity of 0.1 percent to 10 percent, 0.5 percent to 10 percent, or 0.5 percent to 5 percent. In some embodiments, the tubular wall 110 has a porosity less than, equal to, or greater than 0.1 percent, 0.2, 0.3, 0.4, 0.5, 0.7, 1, 2, 3, 4, 5, 6, 7, 8, 9, or 10 percent.

The tubular wall 110 is preferably made from a material having a modulus (i.e., tensile modulus) suitably tuned to vibrate in response to incident sound waves having relevant frequencies. Along with the vibrations of the air plugs within the perforations 112, local vibrations of the tubular wall 110 itself can dissipate sound energy and enhance transmission loss through the conduit 100. The modulus, reflecting the stiffness, of the tubular wall 110 also directly affects its acoustic transfer impedance.

In some embodiments, the tubular wall comprises a material having a modulus of from 0.2 GPa to 10 GPa, 0.2

GPa to 7 GPa, 0.2 GPa to 4 GPa, or in some embodiments, less than, equal to, or greater than a modulus of 0.2 GPa, 0.3, 0.4, 0.5, 0.7, 1, 2, 3, 4, 5, 6, 7, 8, 9, 10, 12, 15, 17, 20, 25, 30, 35, 40, 50, 60, 70, 80, 90, 100, 120, 140, 160, 180, 200, or 210 GPa.

Suitable thermoplastic polymers typically have a modulus in the range of from 0.2 GPa to 5 GPa. Addition of fibers or other fillers can, in some embodiments, increase the modulus of these materials to 20 GPa. Thermoset polymers generally have a modulus in the range of from 5 GPa to 40 GPa. Useful polymers include polyolefins, polyesters, fluoropolymers, polylactic acid, poly phenylene sulfide, polyacrylates, PVC, polycarbonates, polyurethanes, and blends thereof.

In general terms, the sound absorption characteristics that can be ascribed to a plurality of perforations disposed in a flexible film are described in, for example, U.S. Pat. No. 6,617,002 (Wood), U.S. Pat. No. 6,977,109 (Wood), and U.S. Pat. No. 7,731,878 (Wood).

Figure 3:
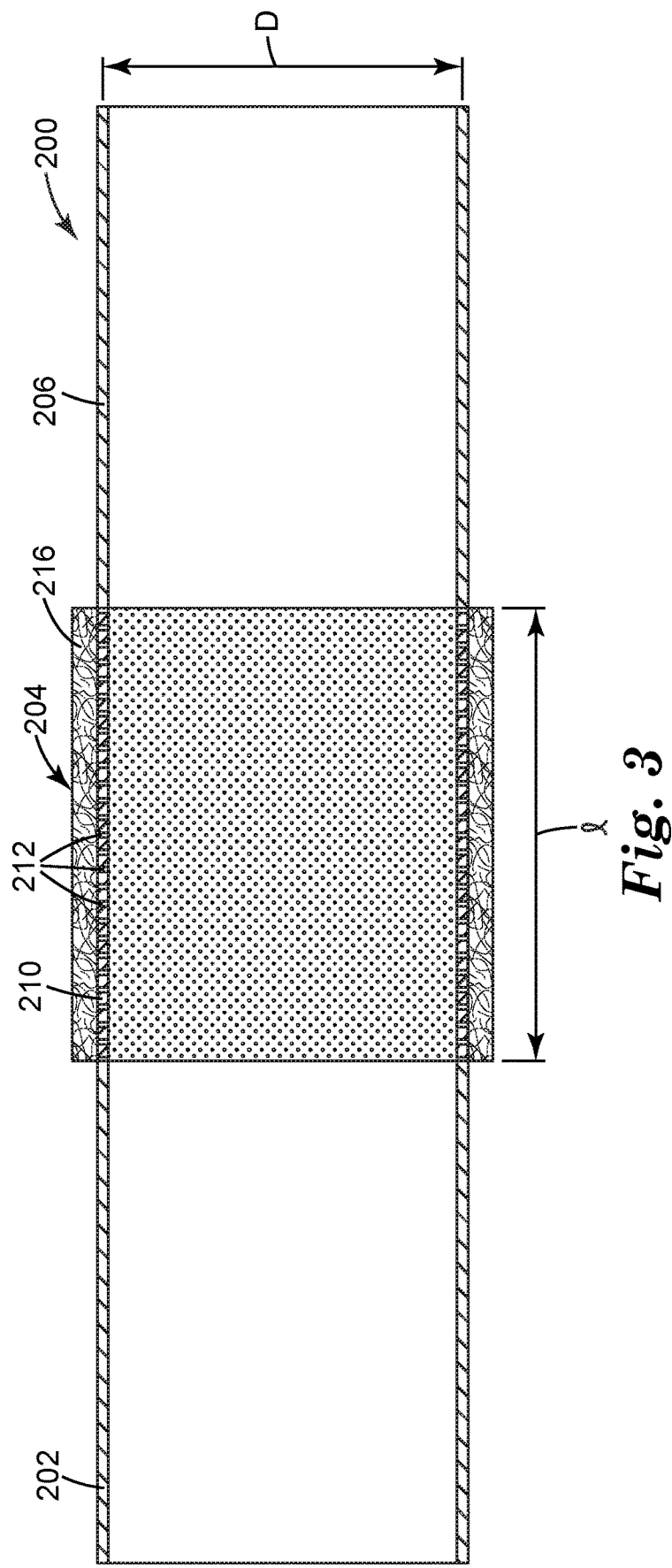
FIGS. 3-11 are side, cross-sectional views of conduits
according to other exemplary embodiments.

FIG. 3 shows a conduit 200 according to another exemplary embodiment. The conduit 200, like the conduit 100, has a central, microperforated section 204 including a tubular wall 210 with perforations 212 extending therethrough. The microperforated section 204 is disposed between two non-perforated sections 202, 206 as shown.

The tubular wall 210 is wrapped with a fibrous layer 216 extending along the outward-facing surfaces of the tubular wall 210. The fibrous layer 216 can be an annular layer, as shown, or may extend only partially around the tubular wall 210. Optionally and as shown, the fibrous layer 216 and tubular wall 210 directly contact each other. If the fibrous layer 216 and tubular wall 210 do not directly contact each other, the conduit 200 can include interposing structure (such as an adhesive) to couple the fibrous layer 216 and tubular wall 210 to each other in a fixed orientation.

An advantage of using the configuration shown in FIG. 2 derives from the fibrous layer 216 reducing flow leakage through the perforations 212 as would normally occur because of back pressure as air flows through the conduit. As a further benefit, the fibrous layer 216 can itself to provide acoustic attenuation.

Fibrous materials that can be used in the fibrous layer 216 include fiberglass, nonwoven acoustic absorbers composed of polyester and polypropylene fibers (such as Thinsulate™ Acoustic Insulation by 3M Company, St. Paul, Minn.), melt blown microfibers, cotton fibers, open-celled foams, and combinations thereof. In some embodiments, the fibrous material has a flow resistance in the range of from 100 to 10,000 MKS Rayls.

The thickness of the fibrous layer 216 is not particularly restricted. In a preferred embodiment, the thickness is suitable to significantly attenuate noise and reduce air flow leakage without significantly enlarging the overall dimensions of the conduit. The thickness (or average thickness) of the fibrous layer 216 can be from 0.5 percent to 200 percent, from 5 percent to 100 percent, from 10 percent to 50 percent, or in some embodiments, less than, equal to, or greater than 0.5 percent, 1, 2, 3, 4, 5, 6, 7, 8, 9, 10, 12, 14, 16, 18, 20, 25, 30, 35, 40, 45, 50, 60, 70, 80, 90, 100, 150, or 200 percent of the inner diameter of the tubular wall 210.

Figure 4:
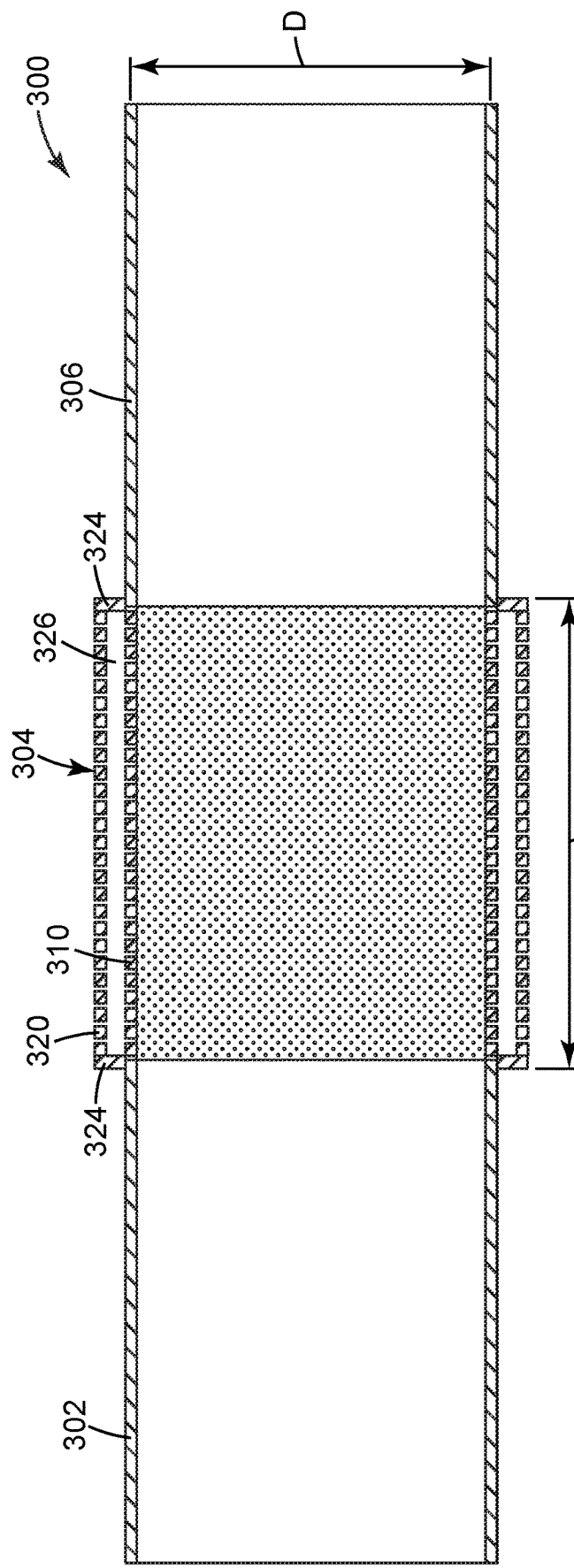

FIG. 4 shows a conduit 300 with some structural similarities to the conduit 100 except the conduit 300 includes an outer microperforated layer extending around an inner microperforated layer.

Overall, the conduit 300 has a microperforated section 304 disposed between two non-perforated sections 202, 206 as shown. The microperforated section 304 includes an inner tubular wall 310, an outer tubular wall 320, and walls 324 connecting the inner and outer tubular walls 310, 320 to each other. Here, the walls 324 are planar and generally perpendicular to the longitudinal axis of the inner and outer tubular walls 310, 320. Other variants are also possible in which the walls 324 are tapered and/or rounded, for example.

Referring again to FIG. 4, each of the first and second tubular walls 310, 320 are perforated with respective perforations 312, 322 extending therethrough. The first and second tubular walls 310, 320 and planar walls 324 collectively define a gap 326. The gap 326 represents a peripheral chamber with the shape of a cylindrical shell extending around the first tubular wall 310. In this exemplary embodiment, the gap 326 is unfilled—that is, substantially no solid or liquid structures occupy the space within the gap 326.

The inner and outer tubular walls 310, 320 can have any suitable diameter, and their relative diameters are likewise not restricted. The inner tubular wall 310 can have, for example, an inner diameter that is from 30 percent to 95 percent, 40 percent to 90 percent, 50 percent to 85 percent, or in some embodiments, less than, equal to, or greater than, 30, 35, 40, 45, 50, 55, 60, 65, 70, 75, 80, 85, 90, or 95 percent of the inner diameter of the outer tubular wall 320.

The microperforated section 304, relative to the previous embodiments, provides additional surface area within the conduit 300 that is microperforated. The outer tubular wall 320 can further reduce flow leakage. Further, in some embodiments, the presence of an additional microperforated wall can reduce noise via two mechanisms—forming a Helmholtz resonator and providing a tortuous path to dissipate the acoustic waves. Advantageously, the inner and outer tubular walls 310, 320 can be configured to have different mechanical properties (e.g., modulus, density) and/or include microperforations of different sizes or shapes to attenuate noise at particular frequencies of interest.

Figure 5:
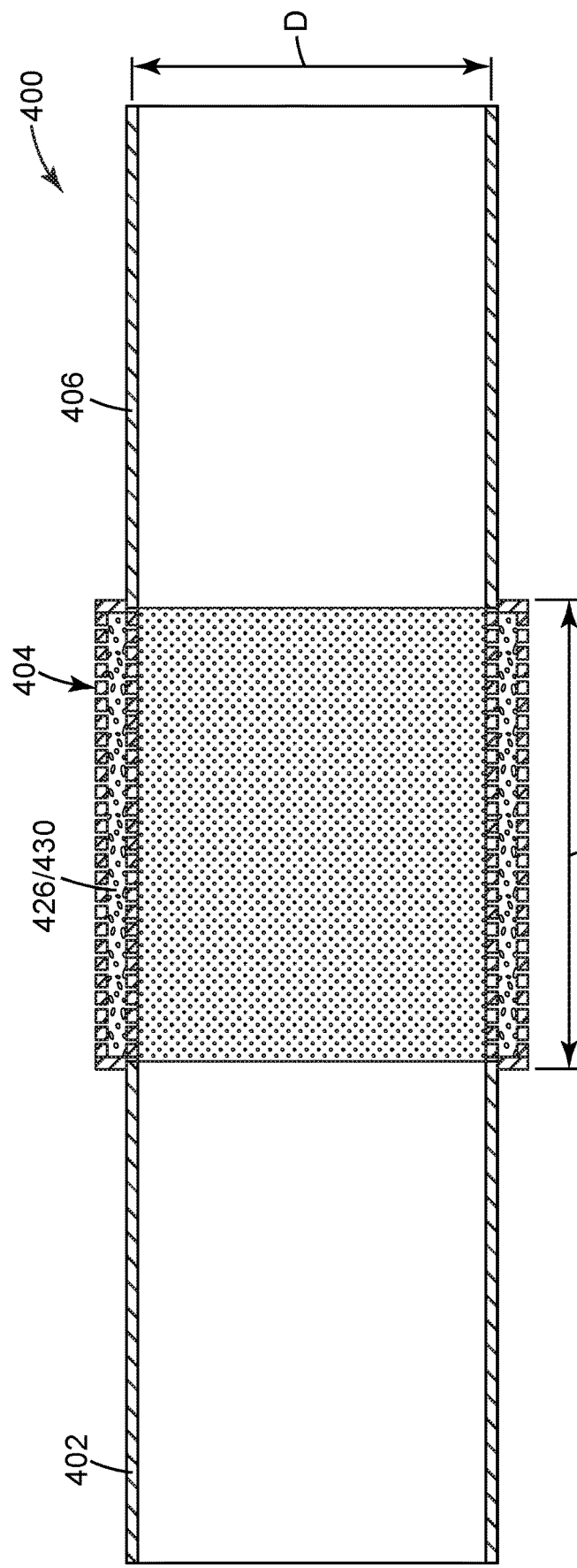

FIG. 5 shows a conduit 400 according to another embodiment having sections 402, 404, 406 similar to those of conduit 300 in many respects. Like the conduit 300, the conduit 400 has a microperforated section 404 with a gap 426 therein. The gap 426 in the conduit 400, however, is filled with acoustic particles 430 to further enhance air flow and acoustic properties.

Figure 6:
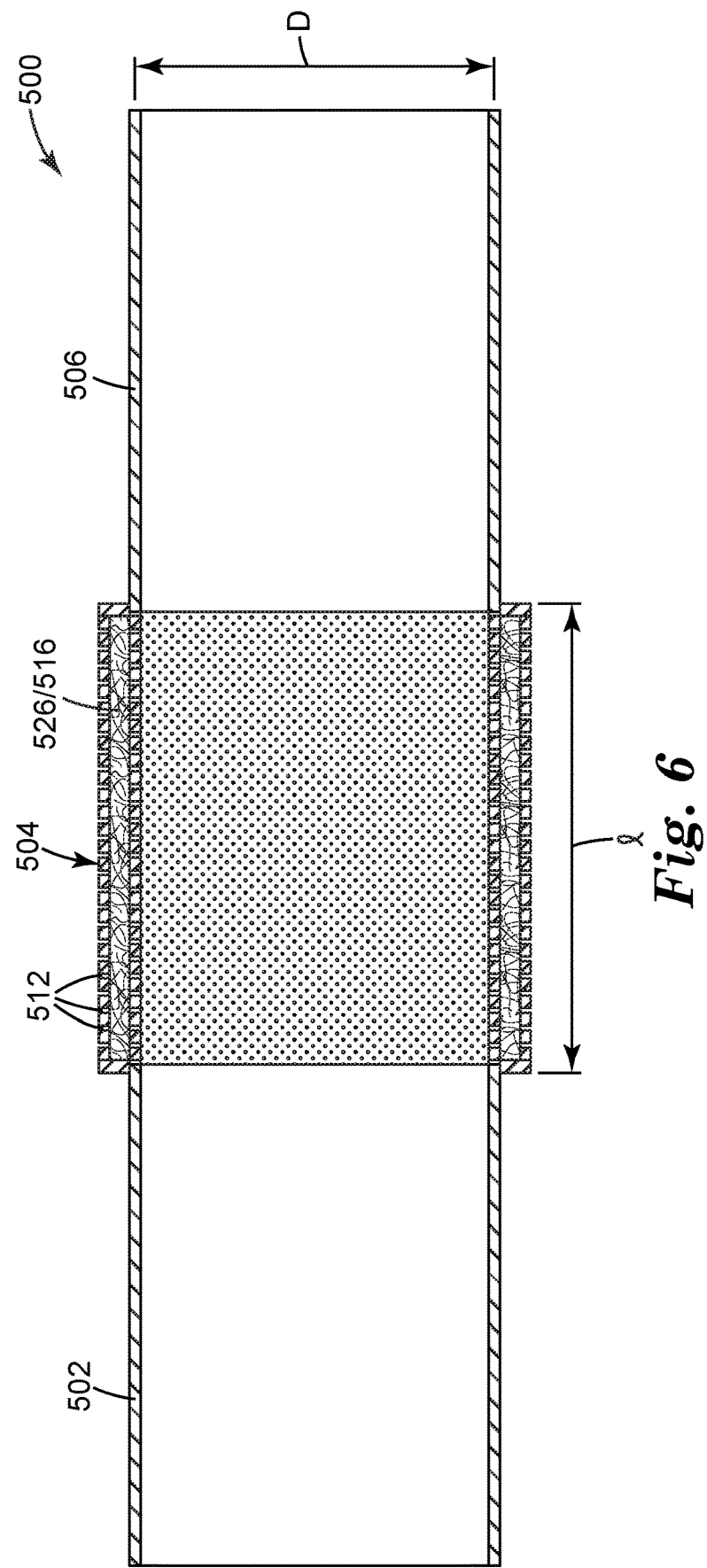

FIG. 6 shows a conduit 500 according to still another embodiment with tubular microperforated and non-microperforated sections 502, 504, 506 similar to those illustrated in FIGS. 4-5. In this embodiment, the conduit 500 has a gap 526 filled with a fibrous material 516.

The acoustic particles 430 and fibrous material 516 in FIGS. 5 and 6 represent exemplary acoustic insulation materials. Useful materials can include, for example, a fibrous material, foam, particulate layer, or combination thereof. Fibrous materials include both woven and nonwoven materials. In embodiments with a particulate layer, the particulate layer can include acoustically active particles that are porous to provide a high surface area. Porous particles include, for example, activated carbon and zeolite particles. In some embodiments, the particles have a surface area of at least 100 $m^2/g$, at least 200 $m^2/g$, at least 300 $m^2/g$, at least 400 $m^2/g$, or at least 600 $m^2/g$.

Advantageously, the acoustic insulation material can provide a high surface area capable of decreasing the speed of sound of the air within the conduit 400. This can have the effect of shortening the wavelength inside the microperforated section 404, allowing the gaps 426, 526 to be made significantly smaller and reducing the overall amount of space required to accommodate the conduit.

The overall dimensions of the conduit can be selected to provide acceptable noise reduction, air flow properties, and structural integrity within the constraints of a given enclosure.

In exemplary embodiments, either or both of the microperforated and non-perforated sections can have average inner diameters in the range of from 1 cm to 150 cm, from 1 cm to 100 cm, from 1 cm to 50 cm, or in some embodiments, less than, equal to, or greater than 1 cm, 2, 3, 4, 5, 6, 7, 8, 9, 10, 12, 15, 17, 20, 25, 30, 35, 40, 45, 50, 55, 60, 65, 70, 75, 80, 85, 90, 95, or 100 cm.

Further, either or both of the microperforated and non-perforated sections can have overall lengths in the range of from 1 cm to 300 cm, from 1 cm to 200 cm, 1 cm to 100 cm, or in some embodiments, less than, equal to, or greater than 1 cm, 2, 3, 4, 5, 6, 7, 8, 9, 10, 12, 15, 17, 20, 25, 30, 35, 40, 45, 50, 55, 60, 65, 70, 75, 80, 85, 90, 95, 100, 110, 120, 130, 140, 150, 160, 170, 180, 190, 200, 220, 240, 260, 280, or 300 cm.

Advantageously, a microperforated conduit section disposed between two non-perforated conduit sections can sufficiently alter the acoustic cavity to reduce conduit resonance, contributes to broadband noise as noise propagates through the conduit. It was discovered, surprisingly, that relatively short lengths of microperforated conduit section can nonetheless be effective in reducing noise induced by duct resonance.

The ratio between the overall length of the microperforated or non-perforated section and its average inner diameter can be from 0.01:1 to 3:1, from 0.5:1 to 2:1, from 1:1 to 2:1, or in some embodiments, less than, equal to, or greater than 0.01:1, 0.02:1, 0.03:1, 0.04:1, 0.05:1, 0.07:1, 0.1:1, 0.2:1, 0.3:1, 0.4:1, 0.5:1, 0.6:1, 0.7:1, 0.8:1, 0.9:1, 1:1, 1.2:1, 1.4:1, 1.5:1, 1.6:1, 1.8:1, 2:1, 2.2:1, 2.4:1, 2.5:1, 2.6:1, 2.8:1, or 3:1.

It is to be understood that the characteristics of the microperforated walls appearing in the conduits of FIGS. 3-6 are analogous to those already described with respect to the conduit 100 and are therefore need not be repeated.

FIGS. 7-10 show conduits according to alternative embodiments, each of which contains a least one microperforated section disposed within a tubular section that is not perforated or otherwise substantially non-perforated. As will be shown, the microperforated section(s) may or may not be tubular in shape. In these constructions, the microperforated sections are positioned in parallel with the non-perforated or substantially non-perforated sections.

Figure 7:
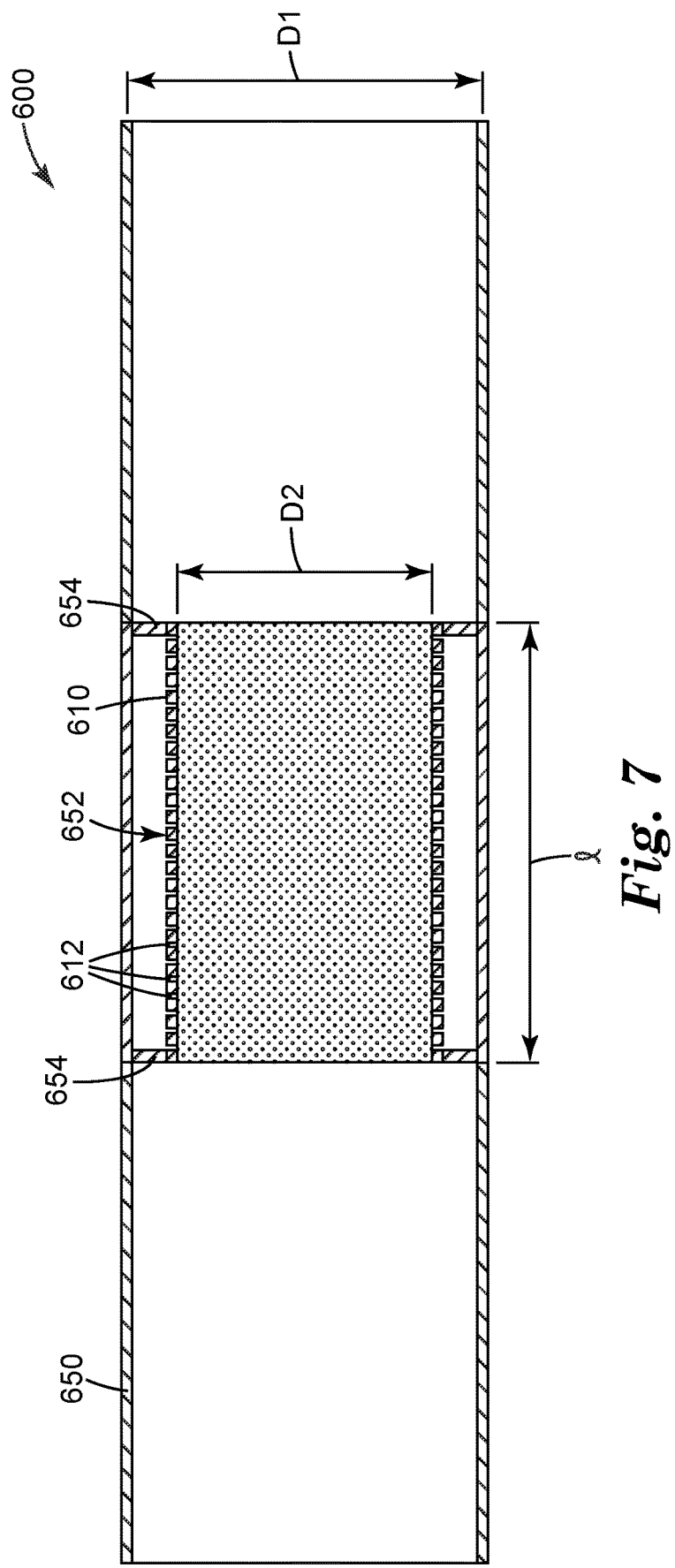

FIG. 7 exemplifies a conduit 600 comprised of a non-perforated section 650 and a smaller microperforated section 652. Optionally and as shown here, sections 650, 652 are concentric cylinders. The microperforated section 652 does not extend along the entire length of the non-perforated section 650, but only along a middle segment. While not shown here, the microperforated section 652 could be a terminal segment extending to the very end of the non-perforated section 650 (for example, one third of the conduit 600 on the right side of FIG. 7 could be omitted).

As shown, the microperforated section 652 includes a tubular wall 610 with perforations 612 extending therethrough. The tubular wall 610 is mechanically coupled to the walls of the non-perforated section 650 by walls 654, which enclose the peripheral chamber provided between the microperforated section 652 and the non-perforated section 650. Here, the walls 654 are annular and fully occlude this peripheral chamber on both ends, thereby preventing direct flow of air into this space.

Alternatively, the walls 654 can only partially occlude the space between the microperforated section 652 and the non-perforated section 650—for example, the walls 654 may not extend entirely around the microperforated section 652. Alternatively, the walls 654 may themselves be microperforated, like the microperforated section 652. Some of these alternative embodiments may be preferred in situations where improved air flow (e.g., reduced back pressure) is required.

The walls 654, which serve to rigidly secure the microperforated section 652 to the remaining components of the conduit 600, can assume any suitable shape for this purpose. If desired, additional walls may be included at intermediate locations along the length of the microperforated section 652 for added stability. Further, as before, the walls 654 may be discontinuous, or otherwise provided with openings or perforations to allow air flow freely through the gap between the microperforated section 652 and the non-perforated section 650.

Figure 8:
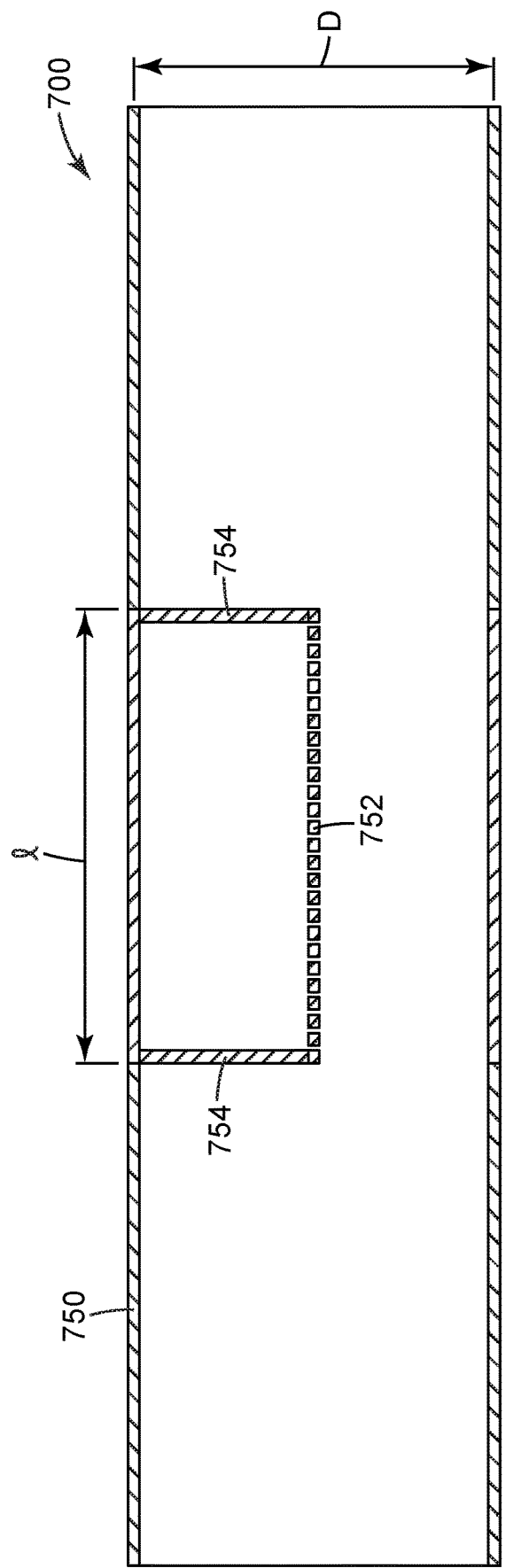

FIG. 8 shows a conduit 700 with a non-perforated section 750 that is cylindrical and a microperforated section 752 that is planar. The microperforated section 752, as shown here, extends along an imaginary plane bisecting lengthwise the cylindrical conduit. The microperforated section 752 extends along only a portion of the length of the conduit 700 as shown.

The walls 754, which are in this case semi-circular, extend at right angles from the ends of the microperforated section 752 toward one side of the non-perforated section 750. The walls 754 form a seal against the non-perforated section 750 and, along with the microperforated section 752, enclose a semi-cylindrical chamber 726 as shown. In alternative embodiments, the microperforated section 752 could assume other configurations within the conduit 700—for example, the microperforated section 752 could have other shapes, such as non-planar shapes, and other orientations. The walls 754 may also have any of the alternative configurations previously described.

Figure 9:
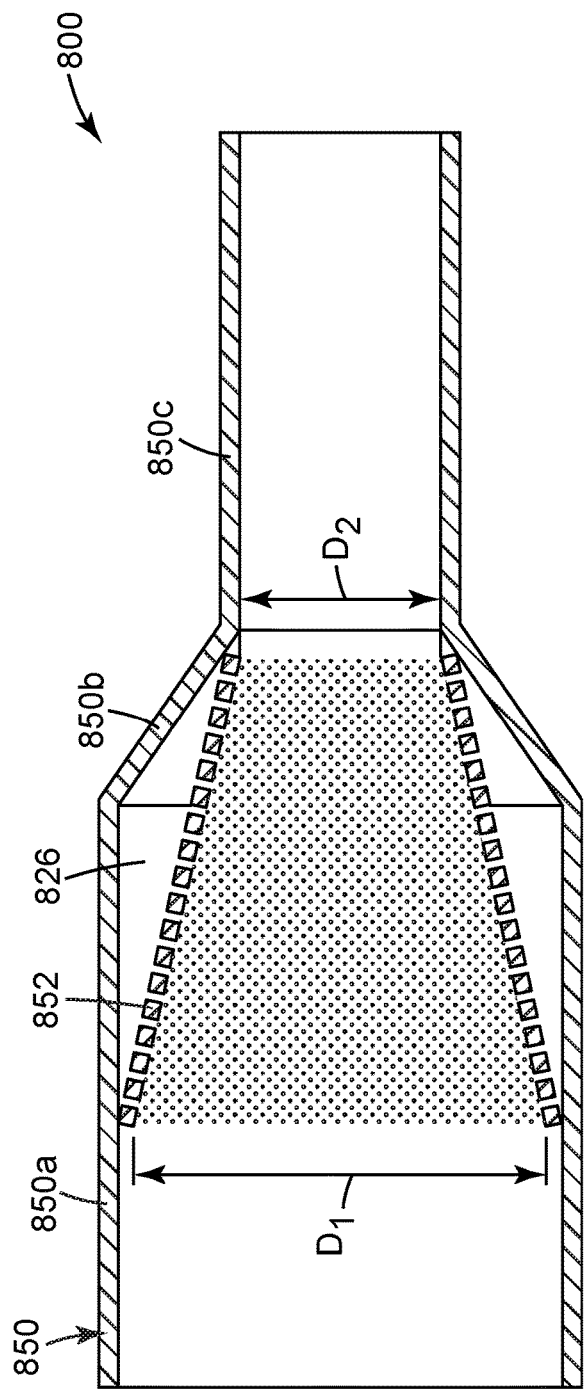

FIG. 9 shows a conduit 800 with a non-perforated section 850. The non-perforated section 850 includes three non-perforated segments 850a, 850b, 850c that are connected to each other in series. In the depicted embodiment, the end segments 850a, 850c are both cylindrical, the latter having a smaller cross-sectional diameter than that of the former. The middle segment 850b has the shape of a truncated cone, providing the tapered transition region between the end segments 850a, 850c shown in FIG. 9.

A microperforated section 852 extends between a midpoint location of the segment 850a and the inlet to the segment 850c. As shown, the microperforated section 852 has the shape of a truncated cone, like middle segment 850b, but with a more gradual taper. Because the taper of the microperforated section 852 is slight compared with that of the middle segment 850b, an annular gap 826 is formed between the non-perforated section 850 and the microperforated section 852.

The microperforated section 852 of the conduit 800 advantageously reduces pressure drop by guiding air flow through the narrowing portion of the segments 850a, 850b. The microperforated section 852, with perforations that are properly tuned to the noise generated within the conduit, can also acts to attenuate sound energy by inducing perforation resonances as well as viscous energy dissipation that can be created when air flows through the perforations. The gap 826 also represents a peripheral chamber enabling sound waves to reflect and destructively interfere with incident sound waves along the microperforated section 852.

Figure 10:
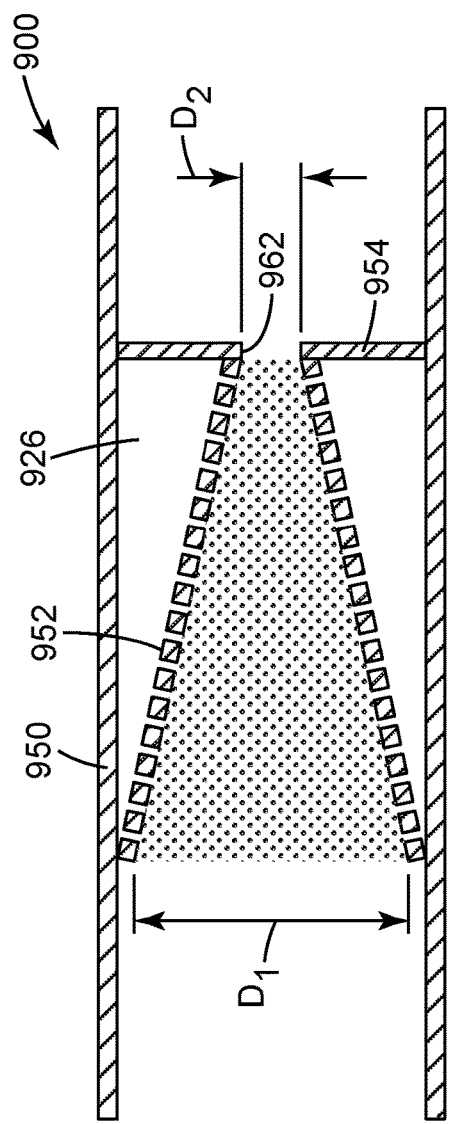

FIG. 10 shows a conduit 900 according to yet another embodiment in which the conduit diameter is reduced within an outer jacket of constant diameter. Such an embodiment may be suitable in non-HVAC applications, where an increase is backpressure tolerated or even intended, such as in an exhaust muffler for a combustion engine.

In the conduit 900, a conical microperforated section 952 resides within a non-perforated section 950 that is cylindrical. The inlet of the microperforated section 952 forms a seal against the inner wall of the non-perforated section 950. The outlet of the microperforated section 952, which is significantly smaller in diameter, forms a seal against constriction 960. The constriction 960 has an annular shape and resides in a plane perpendicular to the longitudinal axis of the conduit 900. The constriction 960 is circumscribed by the non-perforated section 950 and has a circular opening 962 aligned with the outlet of the microperforated section 952.

The conduit 900 provides many of the same benefits described earlier with respect to the conduit 800 but does so while maintaining a uniform cross-section.

In some embodiments, the flow of air through these conduits 800, 900 is reversed; that is, the air can be directed through the conduit from right to left in FIGS. 9 and 10 whereby conduit diameter is increasing rather than decreasing. Both arrangements are possible because the configuration of FIG. 9 is especially effective in attenuating high frequency noise components (such as in a low pass filter), while the reversed configuration is especially effective in attenuating low frequency noise components (such as in a high pass filter).

Figure 11:
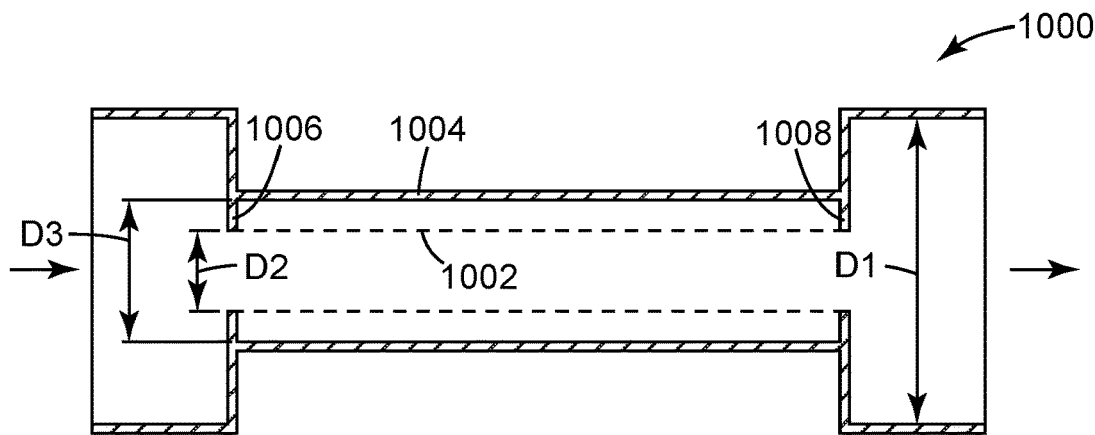

FIG. 11 shows yet another conduit 1000 having an inner tubular wall 1002 and an outer tubular wall 1004 extending long a portion of the inner tubular wall 1002, where the inner and outer tubular walls 1002, 1004 are in the shape of concentric cylinders. Annular walls 1006, 1008 occlude direct air flow in and out of the peripheral chamber located between the inner and outer tubular walls 1002, 1004. The inner tubular wall 1002 is microperforated, while the outer tubular wall 1004 is not. This conduit 1000 differs from others in that both tubular walls 1002, 1004 are constricted relative to the inlet and outlet of the conduit 1000.

While not exhaustively depicted or described, it is to be understood that any reasonable combination of the aforementioned conduit features may be used to obtain further noise reduction. For example, any of the microperforated walls shown in FIGS. 7-11 could be lined with an acoustic insulation material. As another example, certain non-perforated walls depicted in the exemplary embodiments may be replaced with microperforated walls without adverse effect on the function and operation of the provided conduit.

In some applications, it can be advantageous to retrofit an existing conduit to reduce noise. Such a solution may entail replacing some or all of an existing conduit to obtain a conduit configuration described herein.

Noise reduction may be accomplished, for example, by removing a first section of conduit from the existing conduit, where the first portion is substantially non-perforated. A second section of conduit can then be inserted in place of the first section. At least a portion of the second section has a multiplicity of microperforations in fluid communication with the remaining portion of the conduit.

As a further option, an existing portion of conduit may be augmented with an additional section of conduit that is microperforated. The additional section may reside internally or externally with respect to the existing portion of conduit.

The potential applications for the provided microperforated conduit can, in some cases, be very different from those above. For example, the provided conduits may be used to reduce noise in applications where the source of noise is located within the conduit itself.

Figure 12:
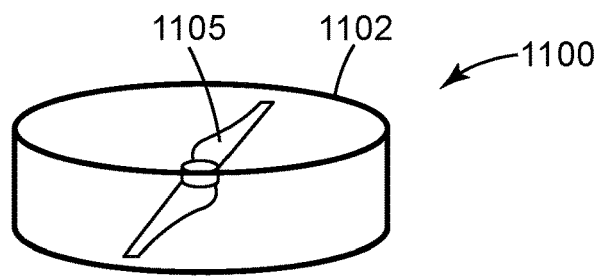
FIG. 12 is a perspective view of a conduit deployed in a
fan assembly.

FIG. 12 shows a simple example of an application where the noise source resides within the conduit—an inline fan assembly 1100. The fan assembly 1100 is comprised of a tubular wall 1102 and a plurality of rotating fan blades 1105 disposed within the tubular wall 1102. The tubular walls 1102 includes a microperforated wall or layer, as previously described, to assist in reducing noise generated by the fan.

The tubular walls 1102 in FIG. 12 may further include one or more fibrous layers extending across, and optionally contacting, the microperforated wall or layer, enabling the conduit to provide acoustic absorption over a broader range of sound frequencies. As mentioned previously, this dual-layer configuration can assist in reducing flow leakage through the microperforations.

Figure 13:
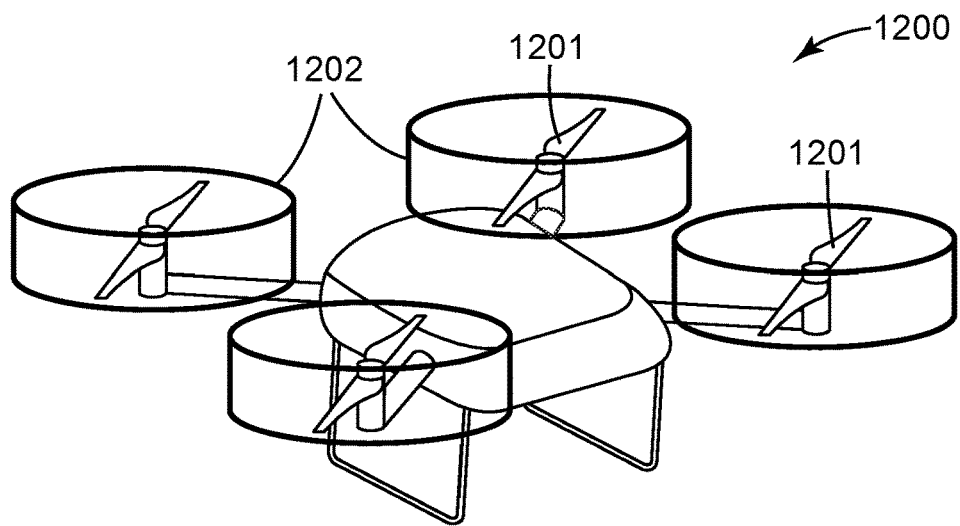
FIG. 13 is a perspective view of conduits deployed in an
unmanned aerial vehicle cowlings.

In yet another application, FIG. 13 shows an unmanned aerial vehicle 1200 (e.g., drone) that uses a plurality of rotating rotor blades 1201 for propulsion. The rotor blades 1201 are located within tubular walls that are microperforated as previously described to form microperforated conduits situated in respective cowlings 1202. The tubular walls can partially or fully surround the rotor blades 1201 as shown to reduce noise produced by the spinning of the rotor blades 1201 within the cowling. Advantageously, the microperforated tubular walls are thin compared with traditional acoustic absorbers, making them especially useful when, as here, space is constrained.

This use of the microperforated walls is especially advantageous because the efficiency of the rotor increases when the distal ends of the rotor blades approach the inner surface of the cowling. Unfortunately, noise also increases as the distance between these surfaces decreases, which leads manufacturers away from use of such configurations. The provided microperforated conduits can resolve this dilemma by enabling reduced clearance between the rotor blades and the cowling and improving thrust efficiency while also mitigating the noise generated therefrom.

Additional non-limiting embodiments are enumerated as follows:

1. A conduit for air flow comprising: a first section that is tubular and substantially non-perforated; and a second section with at least a portion having a multiplicity of microperforations that provide an average flow resistance of from 50 MKS Rayls to 8000 MKS Rayls therethrough, wherein the second section is either (a) tubular and connected in series with the first section, with an outer surface of the second section being in fluid communication with an outer surface of the conduit, or (b) disposed within the first section.

2. The conduit of embodiment 1, wherein the second section is tubular and connected in series with the first section, and the first and second sections have approximately the same inner diameter.

3. The conduit of embodiment 1 or 2, wherein the second section is tubular and connected in series with the first section, and the first and second sections have approximately the same outer diameter.

4. The conduit of any one of embodiments 1-3, wherein the second section is tubular and connected in series with the first section, the second section further comprising an outer wall and an inner wall nested within the outer wall, with microperforations extending through at least the inner wall.

5. The conduit of embodiment 4, wherein the inner and outer walls are tubular walls.
6. The conduit of embodiment 4 or 5, wherein the second section is tubular and connected in series with the first section, at least portions of the inner and outer walls are spaced apart from each other by a gap, and microperforations extend through both the inner and outer walls.
7. The conduit of embodiment 6, further comprising acoustically active particles disposed within the gap.
8. The conduit of embodiment 6 or 7, further comprising a fibrous material disposed within the gap.
9. The conduit of embodiment 6, wherein the gap is substantially unfilled.
10. The conduit of any one of embodiments 4-9, wherein the inner wall has an inner diameter that is 30 percent to 95 percent that of the outer wall.
11. The conduit of embodiment 10, wherein the inner wall has an inner diameter that is 40 percent to 90 percent that of the outer wall.
12. The conduit of embodiment 11, wherein the inner wall has an inner diameter that is 50 percent to 85 percent that of the outer wall.
13. The conduit of embodiment 4 or 5, wherein the outer wall comprises one or more of: a fibrous material, foam, and particulate layer.
14. The conduit of any one of embodiments 1-13, wherein the second section is tubular and connected in series with the first section, and said conduit further comprises a third section that is tubular and connected in series with the second section.
15. The conduit of embodiment 1, wherein the second section is disposed within the first section.
16. The conduit of embodiment 15, wherein the second section is generally planar.
17. The conduit of embodiment 16, wherein the generally planar second section is aligned approximately parallel to the direction of air flow.
18. The conduit of embodiment 15, wherein the second section is tubular.
19. The conduit of embodiment 18, wherein the second section has a fixed diameter.
20. The conduit of embodiment 18, wherein the second section has a variable diameter.
21. The conduit of embodiment 20, wherein the diameter of at least a portion of the second section decreases with respect to the direction of air flow along the conduit.
22. The conduit of embodiment 21, wherein at least of portion of the second section is conical.
23. The conduit of any one of embodiments 1 and 15-22, wherein the second section is disposed within the first section, and the first and second sections are separated by a gap.
24. The conduit of embodiment 23, further comprising an acoustic insulation material disposed within the gap.
25. The conduit of embodiment 24, where in the acoustic insulation material comprises one or more of: a fibrous material, foam, and particulate layer.
26. The conduit of embodiment 23, wherein the gap is substantially unfilled.
27. The conduit of any one of embodiments 23-26, wherein the gap extends along a portion of the first section having a decreasing cross-sectional diameter.
28. The conduit of any one of embodiments 1 and 15-27, wherein the second section is disposed within the first section, and the second section extends along only a portion of the first section.
29. The conduit of any one of embodiments 1-28, wherein the microperforated portion of the second section has a porosity of from 0.1 percent to 10 percent.
30. The conduit of embodiment 29, wherein the microperforated portion of the second section has a porosity of from 0.5 percent to 10 percent.
31. The conduit of embodiment 30, wherein the microperforated portion of the second section has a porosity of from 0.5 percent to 5 percent.
32. The conduit of any one of embodiments 1-31, wherein the second section has an average inner diameter of from 1 cm to 150 cm and an overall length of from 1 cm to 300 cm.
33. The conduit of embodiment 32, wherein the second section has an average inner diameter of from 1 cm to 100 cm and an overall length of from 1 cm to 200 cm.
34. The conduit of embodiment 33, wherein the second section has an average inner diameter of from 1 cm to 50 cm and an overall length of from 1 cm to 100 cm.
35. The conduit of any one of embodiments 1-34, wherein the ratio between the overall length of the second section and its average inner diameter is from 0.01:1 to 3:1.
36. The conduit of embodiment 35, wherein the ratio between the overall length of the second section and its average inner diameter is from 0.5:1 to 2:1.
37. The conduit of embodiment 36, wherein the ratio between the overall length of the second section and its average inner diameter is from 1:1 to 2:1.
38. The conduit of any one of embodiments 1-37, wherein the microperforated portion of the second section comprises a material having a modulus ranging from 0.2 GPa to 210 GPa.
39. The conduit of embodiment 38, wherein the microperforated portion of the second section comprises a material having a modulus ranging from 5 GPa to 210 GPa.
40. The conduit of embodiment 39, wherein the microperforated portion of the second section comprises a material having a modulus ranging from 5 GPa to 50 GPa.
41. The conduit of any one of embodiments 1-40, wherein the first and second sections are both tubular and concentric.
42. An HVAC system comprising the conduit of any one of embodiments 1-41.
43. A method of reducing noise in an existing conduit comprising: removing a first section of conduit from the existing conduit to form a remaining portion of the conduit, with the first section being substantially non-perforated; and inserting in place of the first section a second section of conduit with at least a portion having a multiplicity of microperforations in fluid communication with the remaining portion of the conduit.
44. The method of embodiment 43, wherein the microperforated portion of the second section has an average flow resistance of from 100 MKS Rayls to 8000 MKS Rayls therethrough.
45. The method of embodiment 44, wherein the microperforated portion of the second section has an average flow resistance of from 100 MKS Rayls to 4000 MKS Rayls therethrough.
46. The method of embodiment 45, wherein the microperforated portion of the second section has an average flow resistance of from 400 MKS Rayls to 3000 MKS Rayls therethrough.
47. A conduit for reducing noise comprising: a tubular section, at least a portion of which has a multiplicity of microperforations that provide an average flow resistance of from 50 MKS Rayls to 8000 MKS Rayls therethrough, the tubular section comprising an outer wall and an inner wall nested within the outer wall, with microperforations extending through one of the walls and wherein the other of the walls comprises one or more of: a fibrous material, foam, and particulate layer, wherein the source of the noise is located within the conduit.

48. A rotor assembly for an unmanned aerial vehicle comprising: a plurality of rotor blades disposed within a conduit, the conduit comprised of a tubular wall, at least a portion of which has a multiplicity of microperforations that provide an average flow resistance of from 50 MKS Rayls to 8000 MKS Rayls therethrough.

EXAMPLES

Test Methods
Acoustic Testing 1—Transmission Loss

The acoustic properties of a microperforated film or panel was measured by following the procedures outlined in ASTM E2611-09 (Standard Test Method for Measurement of Normal Incidence Sound Transmission of Acoustical Materials Based on the Transfer Matrix Method). The data collected from this procedure was used to obtain the acoustic transmission loss.

This data was used to obtain the transfer impedance of the film. One of the outputs of this procedure is a 2×2 transfer matrix that relates the pressure and acoustic particle velocity on the two sides of the microperforated film. By following the procedure outlined below, the elements of the transfer matrix were used to calculate the transfer impedance of the film.

The relationships between pressure and velocity on the front and rear surfaces of the film can be described using the transfer matrix: i.e., $$\begin{bmatrix} p_1 \\ v_1 \end{bmatrix} = \begin{bmatrix} T_{11} & T_{12} \\ T_{21} & T_{22} \end{bmatrix} \begin{bmatrix} p_2 \\ v_2 \end{bmatrix} \quad (1)$$

To calculate the transfer impedance, first assume that the front velocity $v_1$ and the rear velocity $v_2$ are the same (based on the assumption that the flow through the film is incompressible); then the transfer impedance of the film can be described as follows:

$$z_t = \frac{p_1 - p_2}{v_1} = \frac{p_1 - p_2}{v_2} \quad (2)$$

From Equation (1), $p_1$ and $v_1$ can be written in following forms:

$$p_1 = T_{11} p_2 + T_{12} v_2 \quad (3)$$

$$v_1 = T_{21} p_2 + T_{22} v_2 \quad (4)$$

Then it is possible to manipulate Equations (3) and (4) to obtain the following results:

$$p_1 - p_2 = (T_{11} - 1) p_2 + T_{12} v_2 \quad (5)$$

$$T_{21} p_2 = (1 - T_{22}) v_1$$

$$p_2 = \frac{(1 - T_{22})}{T_{21}} v_1 \quad (6)$$

After substituting Equation (6) into Equation (5) one obtains, $$p_1 - p_2 = \frac{(T_{11} - 1)(1 - T_{22})}{T_{21}} v_1 + T_{21} v_1 \quad (7)$$

Then, the transfer impedance was obtained by substituting Equation (7) into Equation (2): i.e., $$z_t = \frac{p_1 - p_2}{v_1} = \frac{(T_{11} - 1)(1 - T_{22})}{T_{21}} + T_{12} \quad (8)$$

$$= \frac{(T_{11} - 1)(1 - T_{22}) + T_{12} T_{21}}{T_{21}}$$

$$= \frac{T_{11} - T_{11} T_{22} + T_{22} + T_{12} T_{21} - 1}{T_{21}}$$

Acoustic Testing 2—Sound Intensity Level

The sound intensity, I, of the sound generated from the exhaust region of the duct was measured by using two or more microphones and calculated from the equation below:

$$I = pv [W/m^2] \quad (1)$$

where, p denotes the acoustic pressure [Pa] and v denotes the acoustic particle velocity [m/s]. The acoustic pressure field for the intensity was measured by using microphones and the acoustic particle velocity was derived from the equation below:

$$v = 1/\rho_0 \int \Delta p / \Delta r \, dt \quad (2)$$

where, $\rho_0$ denotes the density of the gas, t denotes time, $\Delta p$ denotes the pressure difference between the two microphones, and $\Delta r$ denotes the distance between the two microphones, respectively.

The sound intensity level, $L_I$, was calculated from the equation below:

$$L_I = 10 \log_{10}(I/I_0) [dB] \quad (3)$$

where, $I_0$ is $10^{-12}$ W/m².

Acoustic Modeling Calculations

The acoustic properties of a microperforated film or panel were calculated using a COMSOL software package for the modeling. Microperforated tubular wall was modeled as a rigid structure using the finite element analysis. Physical parameters of the microperforated tubular wall, such as hole diameter, porosity, and air flow resistivity were used to calculate the acoustic characteristics of the tubular wall and implemented in the model to calculate the transmission loss of the treated section.

Transmission loss was calculated from the model using following mathematical relationship:

$$TL = 10 \log_{10}(Wi/Wo)$$

where $W_i$ is the input sound power and $W_o$ is the output sound power. In the cases of the constructions, in which the tubular walls (or fibrous layers) are exposed to the air, were modeled by applying the anechoic boundary conditions at the boundaries that were certain distances away from the exposed tubular walls.

Example 1 (FIGS. 1-2) and Example 2 (FIG. 3)

Microperforated tubes as shown in FIGS. 1-2 and FIG. 3 were assembled using the following procedure and materials. A microperforated film was prepared as described in U.S. Pat. No. 6,617,002 (Wood). A film-grade polypropylene resin was used in extrusion of the film then the film was embossed and heat treated so that the embossing created apertures. The resulting film (a microperforated panel ("MPP")) had a thickness of 0.35 mm, a basis weight of approximately 400 grams/meter² and an aperture/perforation density of 111 apertures/cm², with each individual aperture being roughly circular in shape with a diameter ("D") of approximately 100 micrometers. Two flow resistances of the films that were used to demonstrate were approximately 751 MKS Rayls and 1200 MKS Rayls.

The films were made into open ended cylindrical tubes having a diameter of 6.4 cm and lengths "$\ell$" of 5 cm and 10 cm, as listed in Tables 1 and 2. The outer face of microperforated tube was left open in Example 1 (see FIGS. 1-2) and Example 2 was covered with THINSULATE™ product TC1803 obtained from 3M Company, St Paul, Minn. (see FIG. 3).

Modeled and measured acoustic transmission loss data for the acoustic devices of Example 1 was as summarized in Table 1.

TABLE 1

| | Modeled Transmission Loss | | | | Acoustic Testing 1 Measured Transmission Loss | | | |
|---|---|---|---|---|---|---|---|---|
| freq (Hz) | MPP FR = 750 Rayl, D = 64 mm, $\ell$ = 50 mm | MPP FR = 750 Rayl, D = 64 mm, $\ell$ = 100 mm | MPP FR = 1200 Rayl, D = 64 mm, $\ell$ = 50 mm | MPP FR = 1200 Rayl, D = 64 mm, $\ell$ = 100 mm | MPP FR = 600 Rayl, D = 64 mm, $\ell$ = 50 mm | MPP FR = 600 Rayl, D = 64 mm, $\ell$ = 100 mm | MPP FR = 2000 Rayl, D = 64 mm, $\ell$ = 50 mm | MPP FR = 2000 Rayl, D = 64 mm, $\ell$ = 100 mm |
| 10 | 5.15 | 8.21 | 3.63 | 6.10 | NT | NT | NT | NT |
| 12.5 | 5.15 | 8.21 | 3.63 | 6.10 | NT | NT | NT | NT |
| 16 | 5.15 | 8.21 | 3.63 | 6.10 | NT | NT | NT | NT |
| 20 | 5.15 | 8.21 | 3.63 | 6.10 | NT | NT | NT | NT |
| 25 | 5.15 | 8.22 | 3.63 | 6.10 | NT | NT | NT | NT |
| 31.5 | 5.15 | 8.22 | 3.63 | 6.10 | 5.59 | 8.47 | 6.72 | 7.39 |
| 40 | 5.15 | 8.22 | 3.63 | 6.11 | 5.67 | 9.45 | 5.00 | 6.63 |
| 50 | 5.16 | 8.23 | 3.63 | 6.11 | 5.56 | 8.29 | 3.81 | 5.71 |
| 63 | 5.16 | 8.24 | 3.63 | 6.11 | 5.55 | 8.43 | 4.03 | 5.86 |
| 80 | 5.16 | 8.26 | 3.63 | 6.12 | 5.69 | 8.44 | 3.91 | 5.83 |
| 100 | 5.16 | 8.29 | 3.63 | 6.14 | 5.65 | 8.48 | 3.85 | 5.83 |
| 125 | 5.17 | 8.33 | 3.63 | 6.16 | 5.57 | 8.44 | 3.78 | 5.72 |
| 160 | 5.18 | 8.41 | 3.64 | 6.19 | 5.47 | 8.43 | 3.66 | 5.63 |
| 200 | 5.19 | 8.51 | 3.64 | 6.24 | 5.50 | 8.59 | 3.66 | 5.72 |
| 250 | 5.21 | 8.67 | 3.65 | 6.32 | 5.47 | 8.73 | 3.61 | 5.76 |
| 315 | 5.24 | 8.91 | 3.67 | 6.44 | 5.52 | 8.98 | 3.67 | 5.90 |
| 400 | 5.29 | 9.25 | 3.69 | 6.62 | 5.38 | 9.22 | 3.60 | 6.65 |
| 500 | 5.36 | 9.67 | 3.72 | 6.85 | 5.54 | 11.9 | 4.18 | 9.08 |
| 630 | 5.46 | 10.1 | 3.76 | 7.13 | 5.44 | 10.5 | 4.03 | 6.81 |
| 800 | 5.60 | 10.7 | 3.82 | 7.46 | 5.69 | 10.6 | 3.76 | 6.96 |
| 1000 | 5.71 | 11.1 | 3.87 | 7.74 | 5.56 | 10.3 | 3.57 | 6.56 |
| 1250 | 5.67 | 11.3 | 3.85 | 7.84 | 5.14 | 10.2 | 3.25 | 6.45 |
| 1600 | 5.11 | 10.1 | 3.60 | 7.30 | 4.89 | 9.42 | 3.04 | 5.99 |
| 2000 | 4.35 | 7.98 | 3.20 | 6.16 | 4.53 | 8.31 | 2.77 | 5.35 |
| 2500 | 4.04 | 6.99 | 3.00 | 5.49 | 3.90 | 7.16 | 2.38 | 4.51 |
| 3150 | 3.76 | 6.37 | 2.78 | 4.95 | 3.37 | 5.54 | 2.29 | 3.84 |
| 4000 | 2.95 | 5.37 | 2.25 | 4.19 | NT | NT | NT | NT |
| 5000 | 2.31 | 4.20 | 1.80 | 3.36 | NT | NT | NT | NT |
| 6300 | 1.68 | 3.27 | 1.35 | 2.61 | NT | NT | NT | NT |
| 8000 | 1.07 | 2.62 | 0.90 | 2.08 | NT | NT | NT | NT |

In Table 1, "NT"= Not Tested

Acoustic transmission loss data (modeled and measured) for the acoustic devices of Example 2 was as summarized in Table 2.

TABLE 2

| | Modeled Transmission Loss | | | | Acoustic Testing 1 Measured Transmission Loss | |
|---|---|---|---|---|---|---|
| freq (Hz) | MPP FR = 750 Rayl, D = 64 mm, $\ell$ = 100 mm (No additional fibers) | MPP FR = 1200 Rayl, D = 64 mm, $\ell$ = 100 mm (No additional fibers) | MPP FR = 750 Rayl, D = 64 mm, $\ell$ = 50 mm, fiber FR = 400 Rayl | MPP FR = 1200 Rayl, D = 64 mm, $\ell$ = 50 mm, fiber FR = 400 Rayl | MPP FR = 600 Rayl, D = 64 mm, $\ell$ = 100 mm (No additional fibers) | MPP FR = 600 Rayl, D = 64 mm, $\ell$ = 100 mm, fiber FR = 500 Rayl |
| 10 | 8.21 | 6.10 | 5.32 | 4.35 | NT | NT |
| 12.5 | 8.21 | 6.10 | 5.45 | 4.44 | NT | NT |
| 16 | 8.21 | 6.10 | 5.60 | 4.54 | NT | NT |

TABLE 2-continued

| | Modeled Transmission Loss | | | | Acoustic Testing 1 Measured Transmission Loss | |
|---|---|---|---|---|---|---|
| freq (Hz) | MPP FR = 750 Rayl, D = 64 mm, $\ell$ = 100 mm (No additional fibers) | MPP FR = 1200 Rayl, D = 64 mm, $\ell$ = 100 mm (No additional fibers) | MPP FR = 750 Rayl, D = 64 mm, $\ell$ = 50 mm, fiber FR = 400 Rayl | MPP FR = 1200 Rayl, D = 64 mm, $\ell$ = 50 mm, fiber FR = 400 Rayl | MPP FR = 600 Rayl, D = 64 mm, $\ell$ = 100 mm (No additional fibers) | MPP FR = 600 Rayl, D = 64 mm, $\ell$ = 100 mm, fiber FR = 500 Rayl |
| 20 | 8.21 | 6.10 | 5.73 | 4.63 | NT | NT |
| 25 | 8.22 | 6.10 | 5.85 | 4.71 | NT | NT |
| 31.5 | 8.22 | 6.10 | 5.97 | 4.78 | 8.47 | 7.73 |
| 40 | 8.22 | 6.11 | 6.08 | 4.86 | 9.45 | 6.18 |
| 50 | 8.23 | 6.11 | 6.19 | 4.92 | 8.29 | 5.35 |
| 63 | 8.24 | 6.11 | 6.29 | 4.98 | 8.43 | 5.62 |
| 80 | 8.26 | 6.12 | 6.38 | 5.04 | 8.44 | 5.55 |
| 100 | 8.29 | 6.14 | 6.48 | 5.10 | 8.48 | 5.54 |
| 125 | 8.33 | 6.16 | 6.57 | 5.15 | 8.44 | 5.48 |
| 160 | 8.41 | 6.19 | 6.68 | 5.22 | 8.43 | 5.48 |
| 200 | 8.51 | 6.24 | 6.79 | 5.28 | 8.59 | 5.58 |
| 250 | 8.67 | 6.32 | 6.93 | 5.36 | 8.73 | 5.83 |
| 315 | 8.91 | 6.44 | 7.11 | 5.47 | 8.98 | 6.43 |
| 400 | 9.25 | 6.62 | 7.35 | 5.60 | 9.22 | 7.08 |
| 500 | 9.67 | 6.85 | 7.61 | 5.76 | 11.9 | 7.32 |
| 630 | 10.2 | 7.13 | 7.87 | 5.94 | 10.5 | 6.73 |
| 800 | 10.7 | 7.46 | 8.11 | 6.10 | 10.6 | 6.41 |
| 1000 | 11.12 | 7.74 | 8.29 | 6.22 | 10.3 | 6.42 |
| 1250 | 11.3 | 7.84 | 8.21 | 6.18 | 10.2 | 6.10 |
| 1600 | 10.1 | 7.30 | 7.52 | 5.77 | 9.42 | 6.05 |
| 2000 | 7.98 | 6.16 | 6.89 | 5.36 | 8.31 | 6.00 |
| 2500 | 6.99 | 5.49 | 7.12 | 5.44 | 7.16 | 6.13 |
| 3150 | 6.37 | 4.95 | 7.37 | 5.43 | 5.54 | 6.07 |
| 4000 | 5.37 | 4.19 | 6.89 | 4.97 | NT | NT |
| 5000 | 4.20 | 3.36 | 5.98 | 4.30 | NT | NT |
| 6300 | 3.27 | 2.61 | 4.62 | 3.38 | NT | NT |
| 8000 | 2.62 | 2.08 | 3.59 | 2.65 | NT | NT |

In Table 2, NT = Not Tested

Table 3 shows the measured acoustic intensity levels, $L_I$, in dB in cases of FIGS. 1-2 and FIG. 3. The intensity levels for two examples were measured at the exhaust end of the duct as well as the measured acoustic intensity level at the region 50 cm away from the exhaust.

TABLE 3

| | No MPP Treated Duct [dB] | FIG. 1 and FIG. 2 MPP FR = 600 Rayl, D = 64 mm, $\ell$ = 100 mm (No additional fibers) | FIG. 3 MPP FR = 600 Rayl, D = 64 mm, $\ell$ = 100 mm, fiber FR = 500 Rayl |
|---|---|---|---|
| $L_I$ at the exhaust (end of tube) | 76.17 | 67.64 | 70.05 |
| $L_I$ at the region 50 cm away from the exhaust (from end of tube) | 55.82 | 49.29 | 50.33 |

Example 3 (FIG. 4)

Provided in Table 4 are modeled and measured acoustic transmission loss data for an acoustic device according to FIG. 4, having the diameter "D" and length "$\ell$".

TABLE 4

| | Modeled Transmission Loss | | | | Acoustic Testing 1 Measured Transmission Loss | |
| --- | --- | --- | --- | --- | --- | --- |
| freq (Hz) | MPP FR = 750 Rayl, D = 64 mm, ℓ = 100 mm (No additional MPP) | MPP FR = 1200 Rayl, D = 64 mm, ℓ = 100 mm (No additional MPP) | MPP FR = 750 Rayl, D = 64 mm, ℓ = 100 mm, delta = 10 mm, MPP2 FR = 750 Rayl | MPP FR = 750 Rayl, D = 64 mm, ℓ = 100 mm, delta = 10 mm, MPP2 FR = 1200 Rayl | MPP FR = 600 Rayl, D = 64 mm, ℓ = 100 mm (No additional MPP) | MPP FR = 600 Rayl, D = 64 mm, ℓ = 100 mm, delta = 10 mm, MPP2 FR = 600 Rayl |
| 10 | 8.21 | 6.10 | 7.02 | 6.23 | NT | NT |
| 12.5 | 8.21 | 6.10 | 6.94 | 6.13 | NT | NT |
| 16 | 8.21 | 6.10 | 6.84 | 6.02 | NT | NT |
| 20 | 8.21 | 6.10 | 6.76 | 5.92 | NT | NT |
| 25 | 8.22 | 6.10 | 6.68 | 5.83 | NT | NT |
| 31.5 | 8.22 | 6.10 | 6.60 | 5.74 | 8.47 | 10.7 |
| 40 | 8.22 | 6.11 | 6.53 | 5.65 | 9.45 | 6.04 |
| 50 | 8.23 | 6.11 | 6.46 | 5.58 | 8.29 | 5.70 |
| 63 | 8.24 | 6.11 | 6.40 | 5.52 | 8.43 | 5.61 |
| 80 | 8.26 | 6.12 | 6.34 | 5.46 | 8.44 | 5.60 |
| 100 | 8.29 | 6.14 | 6.31 | 5.42 | 8.48 | 5.63 |
| 125 | 8.33 | 6.16 | 6.28 | 5.39 | 8.44 | 5.61 |
| 160 | 8.41 | 6.19 | 6.28 | 5.39 | 8.43 | 5.61 |
| 200 | 8.51 | 6.24 | 6.30 | 5.40 | 8.59 | 5.64 |
| 250 | 8.67 | 6.32 | 6.36 | 5.45 | 8.73 | 5.64 |
| 315 | 8.91 | 6.44 | 6.45 | 5.52 | 8.98 | 5.85 |
| 400 | 9.25 | 6.62 | 6.58 | 5.62 | 9.22 | 6.57 |
| 500 | 9.67 | 6.85 | 6.73 | 5.73 | 11.9 | 6.31 |
| 630 | 10.2 | 7.13 | 6.88 | 5.83 | 10.5 | 6.33 |
| 800 | 10.7 | 7.46 | 6.98 | 5.89 | 10.6 | 6.00 |
| 1000 | 11.2 | 7.74 | 6.97 | 5.88 | 10.3 | 6.11 |
| 1250 | 11.3 | 7.84 | 6.80 | 5.80 | 10.2 | 5.85 |
| 1600 | 10.1 | 7.30 | 6.30 | 5.59 | 9.42 | 5.68 |
| 2000 | 7.98 | 6.16 | 5.61 | 5.29 | 8.31 | 5.40 |
| 2500 | 6.99 | 5.49 | 5.19 | 5.23 | 7.16 | 5.43 |
| 3150 | 6.37 | 4.95 | 5.28 | 5.40 | 5.54 | 4.94 |
| 4000 | 5.37 | 4.19 | 4.72 | 5.18 | NT | NT |
| 5000 | 4.20 | 3.36 | 4.56 | 4.88 | NT | NT |
| 6300 | 3.27 | 2.61 | 4.04 | 4.33 | NT | NT |
| 8000 | 2.62 | 2.08 | 3.85 | 3.97 | NT | NT |

Example 4 (FIG. 7)

Acoustic Testing 1 measurements were performed for several acoustic devices according to FIG. 7, with and without microperforated panels (MPP) with the flow resistance ("FR") values listed in Table 5. The value of length "ℓ" was set to 100 mm, and the value of diameter D1 was set to 6.4 cm and inner diameter D2 was set to. A model based on an acoustic device with no MPP is also included in Table 5, for comparison. The measured transmission loss values were as summarized in Table 5.

TABLE 5

| Freq (Hz) | No MPP | MPP FR = 600 Rayl |
| --- | --- | --- |
| 31.5 | 3.33 | 5.17 |
| 40 | 2.12 | 3.61 |
| 50 | 0.80 | 3.22 |
| 63 | 1.31 | 3.91 |
| 80 | 1.70 | 4.53 |
| 100 | 2.03 | 5.38 |
| 125 | 2.45 | 6.10 |
| 160 | 3.08 | 7.01 |
| 200 | 3.78 | 7.77 |
| 250 | 4.32 | 8.34 |
| 315 | 4.57 | 8.81 |
| 400 | 3.98 | 9.27 |
| 500 | 1.87 | 10.6 |
| 630 | 2.54 | 13.8 |
| 800 | 11.9 | 18.1 |
| 1000 | 19.0 | 22.3 |
| 1250 | 24.5 | 26.2 |
| 1600 | 29.8 | 30.3 |
| 2000 | 31.8 | 31.7 |
| 2500 | 28.0 | 28.5 |
| 3150 | 21.9 | 25.8 |

Example 5 (FIG. 8)

Acoustic modeling calculations were performed for several acoustic devices according to FIG. 8, having microperforated panels (MPP) with the different flow resistance ("FR") values listed in Table 6. The value of length "ℓ" was set to 100 mm, and the value of diameter "D" was set to 3 cm. A model based on an acoustic device with no MPP is also included in Table 6, for comparison. The calculated transmission loss values were as summarized in Table 6.

TABLE 6

| freq (Hz) | No MPP | MPP FR = 454 Rayl | MPP FR = 1000 Rayl | MPP FR = 1500 Rayl |
| --- | --- | --- | --- | --- |
| 10 | 5.28E−04 | −2.80E−03 | −2.86E−03 | −2.87E−03 |
| 12.5 | 1.83E−03 | −2.72E−03 | −2.81E−03 | −2.83E−03 |

TABLE 6-continued

| freq (Hz) | No MPP | MPP FR = 454 Rayl | MPP FR = 1000 Rayl | MPP FR = 1500 Rayl |
|---|---|---|---|---|
| 16 | 3.54E-03 | -2.57E-03 | -2.71E-03 | -2.75E-03 |
| 20 | 5.30E-03 | -2.36E-03 | -2.58E-03 | -2.64E-03 |
| 25 | 7.22E-03 | -2.02E-03 | -2.37E-03 | -2.47E-03 |
| 31.5 | 9.38E-03 | -1.48E-03 | -2.03E-03 | -2.19E-03 |
| 40 | 1.19E-02 | -5.79E-04 | -1.47E-03 | -1.72E-03 |
| 50 | 1.44E-02 | 7.51E-04 | -6.43E-04 | -1.03E-03 |
| 63 | 1.75E-02 | 2.92E-03 | 7.09E-04 | 8.87E-05 |
| 80 | 2.10E-02 | 6.48E-03 | 2.94E-03 | 1.94E-03 |
| 100 | 2.46E-02 | 1.17E-02 | 6.23E-03 | 4.65E-03 |
| 125 | 2.86E-02 | 1.97E-02 | 1.13E-02 | 8.86E-03 |
| 160 | 3.35E-02 | 3.34E-02 | 2.03E-02 | 1.62E-02 |
| 200 | 3.85E-02 | 5.20E-02 | 3.29E-02 | 2.65E-02 |
| 250 | 4.41E-02 | 7.81E-02 | 5.18E-02 | 4.20E-02 |
| 315 | 5.06E-02 | 1.14E-01 | 8.06E-02 | 6.61E-02 |
| 400 | 5.76E-02 | 1.60E-01 | 1.23E-01 | 1.03E-01 |
| 500 | 6.37E-02 | 2.08E-01 | 1.76E-01 | 1.55E-01 |
| 630 | 6.99E-02 | 2.57E-01 | 2.48E-01 | 2.37E-01 |
| 800 | 8.40E-02 | 3.20E-01 | 3.58E-01 | 3.85E-01 |
| 1000 | 1.35E-01 | 4.44E-01 | 5.48E-01 | 6.46E-01 |
| 1250 | 2.84E-01 | 7.20E-01 | 9.07E-01 | 1.08E+00 |
| 1600 | 5.43E-01 | 1.12E+00 | 1.37E+00 | 1.55E+00 |
| 2000 | 5.17E-01 | 1.06E+00 | 1.29E+00 | 1.41E+00 |
| 2500 | 4.38E-01 | 1.04E+00 | 1.66E+00 | 2.17E+00 |
| 3150 | 1.89E+00 | 3.07E+00 | 4.04E+00 | 4.56E+00 |
| 4000 | 8.91E-01 | 1.86E+00 | 2.99E+00 | 3.56E+00 |
| 5000 | 4.43E+00 | 6.36E+00 | 6.90E+00 | 6.39E+00 |
| 6300 | 9.30E+00 | 9.69E+00 | 1.07E+01 | 9.50E+00 |
| 8000 | 1.41E+01 | 1.74E+01 | 1.82E+01 | 1.49E+01 |

Example 6 (FIG. 9, with Air Flow in "Contraction" Direction)

Acoustic modeling calculations were performed for an acoustic device according to FIG. 9, having the diameters "D1", "D2" and length "ℓ" values listed in Table 7. In this modeling, the direction of air flow was in the direction from D1 to D2 ("contraction" direction). The calculated transmission loss values were as summarized in Table 7.

TABLE 7

| freq (Hz) | No MPP | MPP FR = 200 Rayl, D1 = 100 mm, D2 = 64 mm, ℓ = 20 mm | MPP FR = 454 Rayl, D1 = 100 mm, D2 = 64 mm, ℓ = 20 mm | MPP FR = 751 Rayl, D1 = 100 mm, D2 = 64 mm, ℓ = 20 mm | MPP FR = 1200 Rayl, D1 = 100 mm, D2 = 64 mm, ℓ = 20 mm |
|---|---|---|---|---|---|
| 10 | 0.838 | 0.838 | 0.838 | 0.838 | 0.838 |
| 12.5 | 0.838 | 0.838 | 0.838 | 0.838 | 0.838 |
| 16 | 0.838 | 0.838 | 0.838 | 0.838 | 0.838 |
| 20 | 0.838 | 0.838 | 0.838 | 0.838 | 0.838 |
| 25 | 0.839 | 0.838 | 0.838 | 0.838 | 0.838 |
| 31.5 | 0.839 | 0.838 | 0.838 | 0.838 | 0.838 |
| 40 | 0.840 | 0.838 | 0.838 | 0.838 | 0.838 |
| 50 | 0.841 | 0.838 | 0.838 | 0.838 | 0.838 |
| 63 | 0.842 | 0.838 | 0.838 | 0.838 | 0.838 |
| 80 | 0.843 | 0.838 | 0.838 | 0.838 | 0.838 |
| 100 | 0.844 | 0.839 | 0.838 | 0.838 | 0.838 |
| 125 | 0.845 | 0.840 | 0.838 | 0.838 | 0.838 |
| 160 | 0.846 | 0.841 | 0.839 | 0.838 | 0.838 |
| 200 | 0.847 | 0.843 | 0.840 | 0.839 | 0.838 |
| 250 | 0.849 | 0.845 | 0.842 | 0.840 | 0.838 |
| 315 | 0.851 | 0.850 | 0.845 | 0.842 | 0.840 |
| 400 | 0.854 | 0.857 | 0.851 | 0.847 | 0.843 |
| 500 | 0.858 | 0.867 | 0.860 | 0.856 | 0.850 |
| 630 | 0.864 | 0.881 | 0.876 | 0.873 | 0.868 |
| 800 | 0.875 | 0.904 | 0.903 | 0.906 | 0.906 |
| 1000 | 0.890 | 0.934 | 0.943 | 0.959 | 0.977 |
| 1250 | 0.915 | 0.977 | 1.01 | 1.05 | 1.11 |
| 1600 | 0.960 | 1.05 | 1.13 | 1.22 | 1.37 |
| 2000 | 1.03 | 1.16 | 1.31 | 1.49 | 1.76 |
| 2500 | 1.16 | 1.37 | 1.66 | 1.97 | 2.36 |
| 3150 | 1.47 | 1.86 | 2.45 | 2.88 | 3.01 |
| 4000 | 3.17 | 4.37 | 4.91 | 4.03 | 2.84 |
| 5000 | 4.66 | 4.14 | 3.60 | 3.20 | 2.85 |
| 6300 | 4.11 | 3.79 | 3.40 | 3.09 | 2.80 |
| 8000 | 4.33 | 2.84 | 1.87 | 1.37 | 1.01 |

Example 7 (FIG. 9, with Air Flow in "Expansion" Direction)

Acoustic modeling calculations were again performed for an acoustic device according to FIG. 9, having the diameters "D1", "D2" and length "ℓ" values listed in Table 7. In this modeling, the direction of air flow was reversed from that in Example 5, having air flow in the direction from the D2 to D1 ("expansion" direction). The calculated transmission loss values were as summarized in Table 8.

TABLE 8

| freq (Hz) | No MPP | MPP FR = 200 Rayl, D1 = 100 mm, D2 = 64 mm, ℓ = 10 mm | MPP FR = 454 Rayl, D1 = 100 mm, D2 = 64 mm, ℓ = 10 mm | MPP FR = 751 Rayl, D1 = 100 mm, D2 = 64 mm, ℓ = 10 mm | MPP FR = 1200 Rayl, D1 = 100 mm, D2 = 64 mm, ℓ = 10 mm |
|---|---|---|---|---|---|
| 10 | 5.19 | 5.19 | 5.18 | 5.18 | 5.18 |
| 12.5 | 5.19 | 5.19 | 5.18 | 5.18 | 5.18 |
| 16 | 5.19 | 5.19 | 5.18 | 5.18 | 5.18 |
| 20 | 5.19 | 5.19 | 5.18 | 5.18 | 5.18 |
| 25 | 5.20 | 5.19 | 5.18 | 5.18 | 5.18 |
| 31.5 | 5.20 | 5.19 | 5.18 | 5.18 | 5.18 |
| 40 | 5.20 | 5.19 | 5.18 | 5.17 | 5.17 |
| 50 | 5.20 | 5.19 | 5.18 | 5.17 | 5.16 |
| 63 | 5.21 | 5.19 | 5.18 | 5.16 | 5.15 |
| 80 | 5.21 | 5.20 | 5.18 | 5.16 | 5.14 |
| 100 | 5.21 | 5.20 | 5.18 | 5.16 | 5.13 |
| 125 | 5.22 | 5.21 | 5.19 | 5.17 | 5.13 |
| 160 | 5.22 | 5.23 | 5.21 | 5.19 | 5.15 |
| 200 | 5.23 | 5.26 | 5.24 | 5.24 | 5.22 |
| 250 | 5.24 | 5.29 | 5.29 | 5.32 | 5.35 |
| 315 | 5.25 | 5.35 | 5.38 | 5.46 | 5.59 |
| 400 | 5.27 | 5.45 | 5.52 | 5.67 | 5.95 |
| 500 | 5.30 | 5.57 | 5.73 | 5.96 | 6.39 |
| 630 | 5.33 | 5.74 | 6.04 | 6.37 | 6.90 |
| 800 | 5.36 | 5.95 | 6.44 | 6.87 | 7.41 |
| 1000 | 5.40 | 6.17 | 6.83 | 7.32 | 7.76 |
| 1250 | 5.42 | 6.37 | 7.11 | 7.60 | 7.82 |
| 1600 | 5.47 | 6.49 | 7.16 | 7.46 | 7.28 |
| 2000 | 5.62 | 6.58 | 7.09 | 7.02 | 6.29 |
| 2500 | 5.93 | 7.03 | 7.64 | 7.40 | 6.52 |
| 3150 | 6.42 | 8.27 | 8.88 | 8.31 | 7.06 |
| 4000 | 9.92 | 10.7 | 8.73 | 6.57 | 4.68 |
| 5000 | -0.45 | 2.26 | 3.74 | 3.91 | 3.42 |
| 6300 | 0.52 | 1.53 | 2.91 | 3.90 | 4.43 |
| 8000 | -0.54 | 1.41 | 1.89 | 2.19 | 2.12 |

Example 8 (FIG. 10)

Acoustic transmission loss data (modeled and measured) for the acoustic device of Example 8 was as summarized in Table 9.

The acoustic device had the diameters "D1", "D2", and length "ℓ" values listed in Table 8. In this modeling, the direction of air flow was from D1 to D2, where D1>D2 ("contraction" direction). The modeled and measured transmission loss values were as summarized in Table 9.

TABLE 9

| freq (Hz) | No MPP, D1 = 30 mm, D2 = 10 mm, ℓ = 50 mm | MPP FR = 454 Rayl, D1 = 30 mm, D2 = 10 mm, ℓ = 50 mm | MPP FR = 751 Rayl, D1 = 30 mm, D2 = 10 mm, ℓ = 50 mm | MPP FR = 1200 Rayl, D1 = 30 mm, D2 = 10 mm, ℓ = 50 mm | No MPP, D1 = 64 mm, D2 = 30 mm, ℓ = 50 mm | MPP FR = 600 Rayl, D1 = 64 mm, D2 = 30 mm, ℓ = 50 mm |
|---|---|---|---|---|---|---|
| 10 | 0.00620 | −1.27E−04 | −9.72E−04 | −0.00146 | NT | NT |
| 12.5 | 0.00788 | 0.00122 | −8.31E−05 | −8.43E−04 | NT | NT |
| 16 | 0.0103 | 0.00359 | 0.00149 | 2.49E−04 | NT | NT |
| 20 | 0.0130 | 0.00694 | 0.00373 | 0.00182 | NT | NT |
| 25 | 0.0163 | 0.0120 | 0.00721 | 0.00427 | NT | NT |
| 31.5 | 0.0204 | 0.0200 | 0.0128 | 0.00823 | 12.5 | 4.33 |
| 40 | 0.0255 | 0.0322 | 0.0217 | 0.0147 | 9.66 | 1.46 |
| 50 | 0.0313 | 0.0485 | 0.0345 | 0.0241 | 7.95 | 1.06 |
| 63 | 0.0385 | 0.0714 | 0.0539 | 0.0391 | 7.18 | 1.21 |
| 80 | 0.0474 | 0.102 | 0.0830 | 0.0627 | 6.36 | 1.45 |
| 100 | 0.0573 | 0.136 | 0.120 | 0.0955 | 5.72 | 1.71 |
| 125 | 0.0691 | 0.175 | 0.169 | 0.142 | 5.21 | 1.95 |
| 160 | 0.0851 | 0.222 | 0.234 | 0.213 | 4.89 | 2.31 |
| 200 | 0.103 | 0.270 | 0.301 | 0.296 | 4.90 | 2.81 |
| 250 | 0.126 | 0.325 | 0.376 | 0.395 | 5.04 | 3.38 |
| 315 | 0.157 | 0.396 | 0.462 | 0.512 | 5.25 | 4.09 |
| 400 | 0.202 | 0.494 | 0.566 | 0.644 | 5.71 | 4.98 |
| 500 | 0.262 | 0.616 | 0.687 | 0.780 | 6.25 | 6.01 |
| 630 | 0.354 | 0.784 | 0.853 | 0.949 | 7.06 | 7.36 |
| 800 | 0.498 | 1.02 | 1.09 | 1.19 | 8.13 | 8.91 |
| 1000 | 0.701 | 1.31 | 1.40 | 1.52 | 9.27 | 10.6 |
| 1250 | 1.00 | 1.71 | 1.86 | 2.06 | 10.4 | 12.5 |
| 1600 | 1.50 | 2.36 | 2.64 | 3.03 | 11.7 | 14.7 |
| 2000 | 2.12 | 3.22 | 3.71 | 4.37 | 12.6 | 16.3 |
| 2500 | 2.89 | 4.40 | 5.11 | 6.04 | 13.5 | 17.3 |
| 3150 | 3.81 | 5.81 | 6.69 | 7.76 | 11.3 | 15.2 |
| 4000 | 5.07 | 7.17 | 8.08 | 9.08 | NT | NT |
| 5000 | 6.77 | 8.55 | 9.56 | 10.5 | NT | NT |
| 6300 | 8.47 | 11.2 | 12.5 | 13.3 | NT | NT |
| 8000 | 10.7 | 13.6 | 14.5 | 13.9 | NT | NT |

Example 9 (FIG. 11)

Acoustic Testing 1 measurements were performed for an acoustic device according to FIG. 11, having the diameters D1=6.4 cm, D2=1.5 cm, D3=2 cm, and length ℓ=10 cm values listed in Table 10. In these measurements, the cross-sectional shape of the microperforated conduit was circular. The measured transmission loss values were as summarized in Table 10.

TABLE 10

| Freq (Hz) | No MPP | MPP FR = 600 Rayl |
|---|---|---|
| 31.5 | 4.26 | 9.30 |
| 40 | 2.69 | 6.83 |
| 50 | 2.16 | 6.23 |
| 63 | 2.30 | 6.52 |
| 80 | 2.57 | 6.65 |
| 100 | 2.93 | 6.83 |
| 125 | 3.33 | 7.05 |
| 160 | 4.06 | 7.56 |
| 200 | 4.88 | 8.33 |
| 250 | 5.81 | 8.99 |
| 315 | 6.85 | 9.95 |
| 400 | 8.02 | 10.9 |
| 500 | 9.28 | 11.8 |
| 630 | 10.72 | 12.8 |
| 800 | 11.8 | 13.8 |
| 1000 | 12.8 | 14.4 |
| 1250 | 13.5 | 14.5 |
| 1600 | 13.3 | 14.3 |
| 2000 | 12.4 | 12.9 |
| 2500 | 9.54 | 10.4 |
| 3150 | 2.54 | 9.87 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A conduit for air flow comprising:
   a first section that is tubular and substantially non-perforated; and
   a second section with at least a portion having a multiplicity of microperforations that provide an average flow resistance of from 50 MKS Rayls to 8000 MKS Rayls therethrough, wherein the second section is tubular and connected in series with the first section, with an outer surface of the second section being in fluid communication with an outer surface of the conduit, and
   further wherein inner and outer diameters of the first section match inner and outer diameters of second section, respectively, and the outer surface of the second section represents an outer surface of the conduit.

2. The conduit of claim 1, wherein the second section is tubular and connected in series with the first section, the second section further comprising an outer wall and an inner wall nested within the outer wall, with microperforations extending through at least the inner wall.

3. The conduit of claim 2, wherein at least portions of the inner and outer walls are spaced apart from each other by a gap, and microperforations extend through both the inner and outer walls.

4. The conduit of claim 3, further comprising acoustically active particles and/or a fibrous material disposed within the gap.

5. The conduit of claim 2, wherein the outer wall comprises one or more of: a fibrous material, foam, and particulate layer.

6. The conduit of claim 1, wherein the second section is tubular and connected in series with the first section, and said conduit further comprises a third section that is tubular and connected in series with the second section.

7. A conduit for air flow comprising:
a first section that is tubular and substantially non-perforated; and
a second section with at least a portion having a multiplicity of microperforations that provide an average flow resistance of from 50 MKS Rayls to 8000 MKS Rayls therethrough, wherein the second section is disposed within the first section.

8. The conduit of claim 7, wherein the second section is generally planar and aligned approximately parallel to the direction of air flow.

9. The conduit of claim 7, wherein the second section is tubular.

10. The conduit of claim 9, wherein the diameter of at least a portion of the second section decreases with respect to the direction of air flow along the conduit.

11. The conduit of claim 1, wherein the second section is disposed within the first section, and the first and second sections are separated by a gap.

12. The conduit of claim 11, further comprising an acoustic insulation material disposed within the gap, the acoustic insulation material comprising one or more of a fibrous material, foam, and particulate layer.

13. The conduit of claim 1, wherein the second section is disposed within the first section, and the second section extends along only a portion of the first section.

14. An HVAC system comprising the conduit of claim 1.

15. A method of reducing noise in an existing conduit comprising:
removing a first section of conduit from the existing conduit to form a remaining portion of the conduit, with the first section being substantially non-perforated; and
inserting in place of the first section a second section of conduit with at least a portion having a multiplicity of microperforations in fluid communication with the remaining portion of the conduit, wherein inner and outer diameters of the first section match inner and outer diameters of second section, respectively, and the outer surface of the second section represents an outer surface of the conduit.

16. The conduit of claim 1, wherein the overall conduit maintains a uniform cross-section along the first and second sections.

* * * * *